(12) United States Patent
Otani et al.

(10) Patent No.: US 10,194,053 B2
(45) Date of Patent: Jan. 29, 2019

(54) IMAGE FORMING APPARATUS AND DENSITY CORRECTION METHOD IN IMAGE FORMING APPARATUS BASED ON CORRECTION CHARACTERISTICS

(71) Applicant: CANON KABUSHIKI KAISHA, Tokyo (JP)

(72) Inventors: Ryosuke Otani, Tokyo (JP); Hidenori Kanazawa, Mishima (JP); Go Araki, Suntou-gun (JP); Yoichi Takikawa, Kawasaki (JP); Hisashi Ishikawa, Urayasu (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 134 days.

(21) Appl. No.: 15/296,710

(22) Filed: Oct. 18, 2016

(65) Prior Publication Data

US 2017/0111547 A1 Apr. 20, 2017

(30) Foreign Application Priority Data

Oct. 19, 2015 (JP) .................. 2015-205738

(51) Int. Cl.
*G06F 3/08* (2006.01)
*G06K 15/00* (2006.01)
*H04N 1/407* (2006.01)
*G03G 15/00* (2006.01)
*H04N 1/00* (2006.01)
*H04N 1/06* (2006.01)
(Continued)

(52) U.S. Cl.
CPC ......... *H04N 1/4072* (2013.01); *G03G 15/043* (2013.01); *G03G 15/50* (2013.01); *G03G 15/5058* (2013.01); *H04N 1/00795* (2013.01); *H04N 1/06* (2013.01); *H04N 1/295* (2013.01); *H04N 2201/0081* (2013.01); *H04N 2201/0082* (2013.01)

(58) Field of Classification Search
CPC .... H04N 1/4072; H04N 1/00795; H04N 1/06; H04N 1/295; H04N 2201/0081; H04N 2201/0082; G03G 15/043; G03G 15/50; G03G 15/5058
USPC ................. 358/518, 1.1, 1.9, 3.04, 3.06, 3.1
See application file for complete search history.

(56) References Cited

U.S. PATENT DOCUMENTS

2014/0376056 A1 12/2014 Fujimoto et al.
2016/0209773 A1 7/2016 Otani
(Continued)

FOREIGN PATENT DOCUMENTS

JP 2007-057954 A 3/2007

*Primary Examiner* — Douglas Tran
(74) *Attorney, Agent, or Firm* — Carter, DeLuca, Farrell & Schmidt LLP

(57) ABSTRACT

An image forming apparatus of the present invention acquires first correction characteristics representing an output density for an input gradation value at a reference position in a main scanning direction and second correction characteristics representing a relative relationship of an output density at a predetermined position in the main scanning direction with the output density at the reference position in the main scanning direction. Then, the image forming apparatus corrects image data corresponding to the predetermined position in the main scanning direction based on the first correction characteristics and the second correction characteristics.

15 Claims, 19 Drawing Sheets

(51) Int. Cl.
*H04N 1/29* (2006.01)
*G03G 15/043* (2006.01)

(56) References Cited

U.S. PATENT DOCUMENTS

2016/0216636 A1\* 7/2016 Itagaki ............. G03G 15/04027
2016/0378040 A1\* 12/2016 Kosuge ............. G03G 15/5058
　　　　　　　　　　　　　　　　　　　　399/72
2017/0111548 A1　　4/2017 Yamamoto et al.

\* cited by examiner

SCREEN TYPE

| INPUT GRADATION VALUE (0-255) | Scr.1 | Scr.2 | ... |
|---|---|---|---|
| 0 | 0 | 0 | |
| 15 | 23 | 27 | |
| 31 | 43 | 49 | |
| 47 | 59 | 65 | |
| 63 | 75 | 81 | |
| 79 | 89 | 94 | |
| 95 | 103 | 107 | |
| 111 | 115 | 117 | |
| 127 | 127 | 127 | |
| 143 | 139 | 137 | |
| 159 | 151 | 147 | |
| 175 | 165 | 160 | |
| 191 | 179 | 173 | |
| 207 | 195 | 189 | |
| 223 | 211 | 205 | |
| 239 | 231 | 227 | |
| 255 | 255 | 255 | |

FIG.3

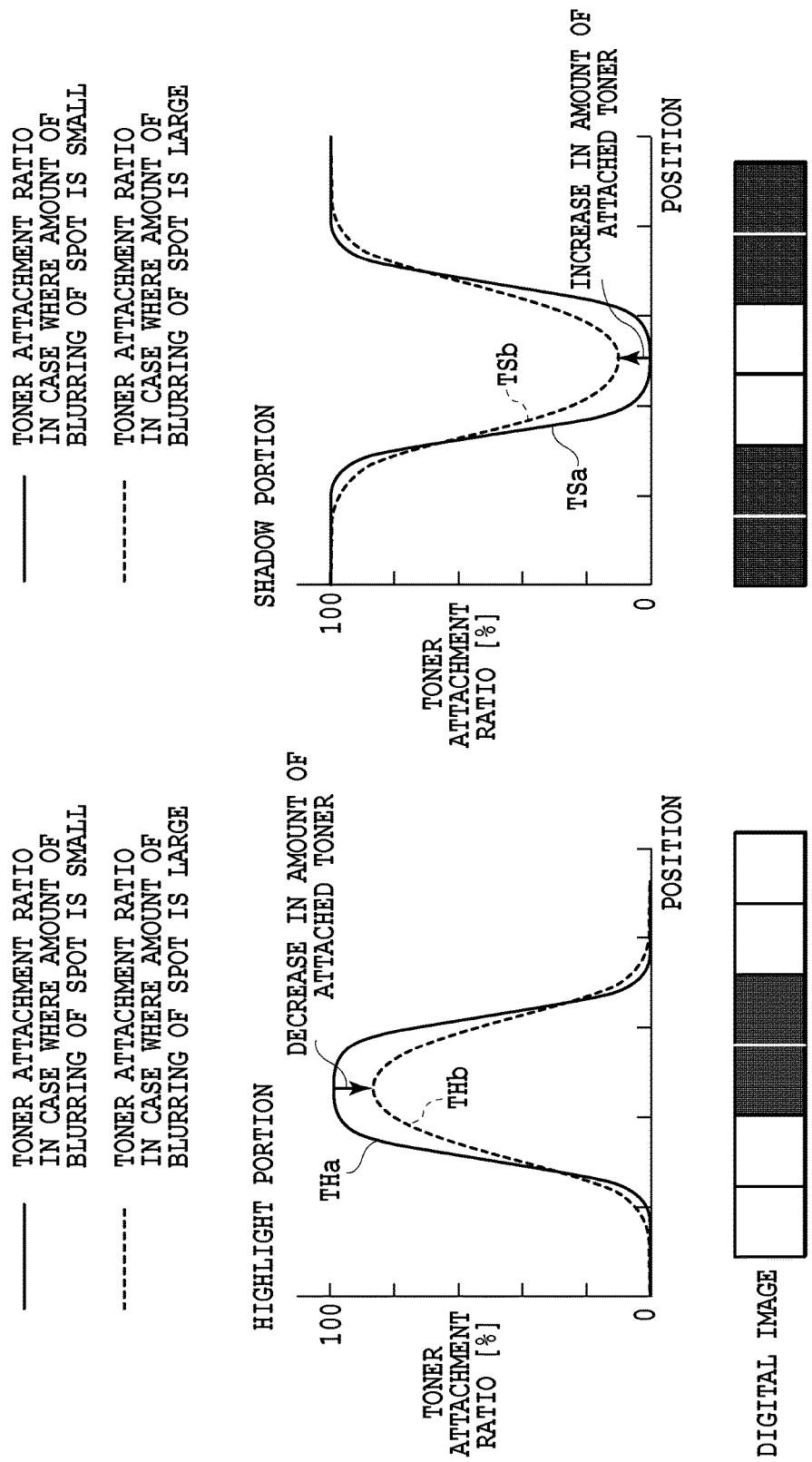

CONFIGURATION OF PRINTER ENGINE

PRINTING POSITION OF PATCH FOR MEASUREMENT P ic image forming apparatus is known, such as a laser beam printer that forms an electrostatic latent image by irradiating a photoconductor drum with laser light and a copy machine. In such an image forming apparatus, gamma correction processing to correct so-called gamma characteristics (input/output characteristics) is performed in order to match a target density with a density to be printed actually. In general, in the gamma correction processing, gamma correction characteristics (correction table) are used to correct the gamma characteristics.

In such an image forming apparatus, there is a case where the actual gamma characteristics deviate from the original gamma characteristics due to the deterioration of a photoconductor drum with the passage of time, the change in the environment, such as temperature and humidity, etc. Because of this, it is common to perform calibration for the gamma correction processing periodically or at timing at which the output error exceeds a threshold value.

In an electrophotographic image forming apparatus, unevenness in density sometimes occurs within a printing surface even in the case where an image with uniform gradation is formed due to the manufacturing error and the assembling error of constituent parts and supports. Such unevenness in density will cause a reduction in the accuracy of calibration for the gamma correction processing. Japanese Patent Laid-Open No. 2007-057954 has disclosed a technique to store corresponding gamma correction characteristics for each of a plurality of positions in the main scanning direction in order to improve the unevenness in density itself.

SUMMARY OF THE INVENTION

However, the gamma characteristics are different for different screen types. Consequently, with the technique described in Japanese Patent Laid-Open No. 2007-057954, it is necessary to store the gamma characteristics at a plurality of positions for each plurality of screens, and therefore, there is such a problem that a large memory area is necessary. Further, a step of calibration is necessary to generate each of the gamma correction characteristics corresponding to each position, and therefore, there is such a problem that the amount of toner to be consumed as well the time taken for updating the gamma correction characteristics increases.

The image forming apparatus according to the present invention is an electrophotographic image forming apparatus that forms an image by scanning a photoconductor drum in a main scanning direction with light beams based on image data, and includes: a first acquisition unit configured to acquire first correction characteristics representing an output density for an input gradation value at a reference position in the main scanning direction; a second acquisition unit configured to acquire second correction characteristics representing a relative relationship of an output density at a predetermined position in the main scanning direction with the output density at the reference position in the main scanning direction; and a correction unit configured to correct the image data corresponding to the predetermined position in the main scanning direction based on the acquired first correction characteristics and the acquired second correction characteristics.

Further features of the present invention will become apparent from the following description of exemplary embodiments (with reference to the attached drawings).

BRIEF DESCRIPTION OF THE DRAWINGS

FIG. 3 is a diagram explaining a reference gamma correction characteristics storage unit in the first embodiment;

FIG. 7A is a diagram explaining a relationship between optical characteristics and output densities in the first embodiment;

FIG. 7B is a diagram explaining a relationship between the optical characteristics and the output densities in the first embodiment;

DESCRIPTION OF THE EMBODIMENTS

In the following, details of embodiments for embodying the present invention are explained. The following embodiments are not those which limit the present invention and all the combinations of the features explained in the embodiments are not necessarily indispensable for the solving means of the present invention.

(First Embodiment)
<Outline of Configuration>

Figure 1:
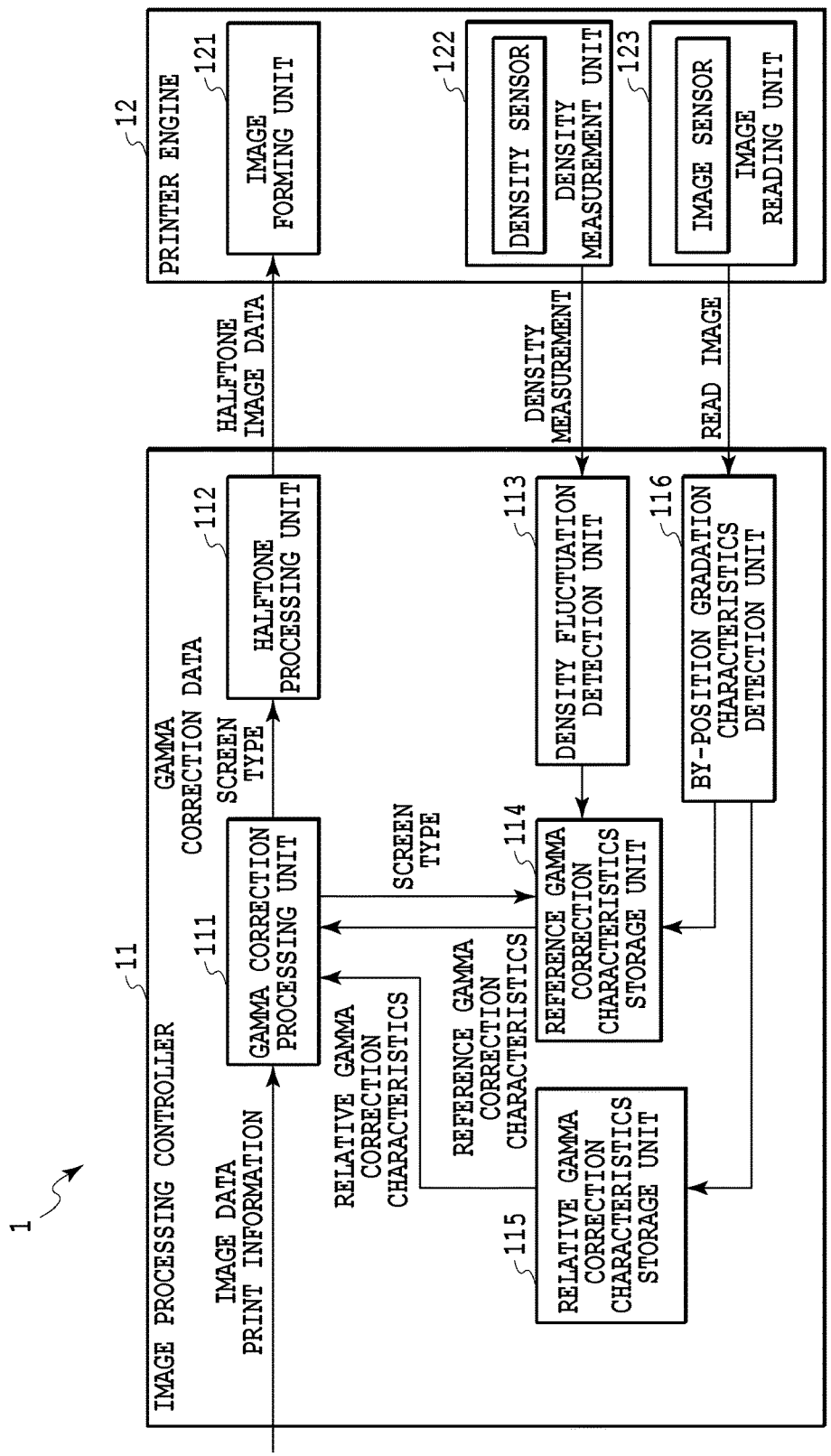
FIG. 1 is a block diagram showing a configuration of an image forming apparatus in a first embodiment.

FIG. 1 is a block diagram showing a configuration of an image forming apparatus 1 according to a first embodiment. The image forming apparatus 1 is a printer capable of forming an image on a printing medium, such as a print sheet, by using toner, a copy machine, etc. The image forming apparatus 1 has an image processing controller 11 and a printer engine 12.

The printer engine 12 is a mechanism configured to produce an image output in accordance with print data (in FIG. 1, corresponding to halftone image data) that is input and has an image forming unit 121, a density measurement unit 122, and an image reading unit 123. The image forming unit 121 is, for example, an electrophotographic printer and reproduces an image indicated by halftone image data and forms the image on a printing medium through the processes of exposure, development, and transfer. The density measurement unit 122 measures, in the case where a patch image for density measurement generated by a density fluctuation detection unit 113, to be described later, is formed by the image forming unit 121, the density of the image. In the present embodiment, the patch image for density measurement is a patch image that is used to detect density fluctuations caused mainly by the deterioration of a photoconductor drum with the passage of time, the change in the environment, such as temperature and humidity, etc. The image reading unit 123 reads, in the case where a gradation patch image generated by a by-position gradation characteristics detection unit 116, to be described later, is formed by the image forming unit 121, the formed image. In the present embodiment, the gradation patch image is a patch image that is used to detect density fluctuations caused mainly by fluctuations in the optical characteristics. Explanation of these patch images will be given later.

The image processing controller 11 is a mechanism configured to generate halftone image data that is used to form an image from input image data by the printer engine 12. The image processing controller 11 has a gamma correction processing unit 111, a halftone processing unit 112, the density fluctuation detection unit 113, a reference gamma correction characteristics storage unit 114, a relative gamma correction characteristics storage unit 115, and the by-position gradation characteristics detection unit 116.

The image forming apparatus 1 described in the present embodiment has three modes, i.e., a normal printing mode, a density fluctuation detection mode, and a relative gamma characteristics detection mode, and the operations of the image processing controller 11 and the printer engine 12 are different in each mode. A CPU, not shown schematically, monitors the state of each mode and the CPU causes the mode to make a transition in accordance with predetermined timing. In the following, the outline of the operation of the image forming apparatus 1 is explained for each operation mode.

Explanation is given by taking the case where processing is performed for single color image data as an example, but it may also be possible to apply the same processing to each piece of image data of CMYK in the case of color printing.

[Normal Printing Mode]

The normal printing mode is a mode in which normal printing is performed in accordance with image data and print information that are input from an external device, not shown schematically. Normally, the image forming apparatus 1 operates in the state of the normal printing mode. The print information includes screen type information indicating a screen type for which processing is performed by the halftone processing unit 112 and printing position information indicating a printing position of a pixel of image data on the photoconductor drum.

In the normal printing mode, the gamma correction processing unit 111 refers to the reference gamma correction characteristics storage unit 114 and the relative gamma correction characteristics storage unit 115. Then, the gamma correction processing unit 111 performs gamma correction processing (density correction processing) for the input image data and generates data after the gamma correction. The gamma correction processing is processing to correct the input gradation value of each pixel of the input image data to a corrected gradation value in accordance with the gamma correction characteristics so that the output density of each pixel of the input image data becomes the output density in accordance with desired gamma characteristics. Hereinafter, data after the gamma correction is referred to as "gamma-corrected data".

The reference gamma correction characteristics storage unit 114 stores the reference gamma correction characteristics for each screen type. The gamma correction processing unit 111 selectively refers to the reference gamma correction characteristics corresponding to the screen type included in the print information, which are stored in the reference gamma correction characteristics storage unit 114. The reference gamma correction characteristics refer to gamma correction characteristics at a position in the main scanning direction that serves as a reference (specifically, a position corresponding to a density sensor). The main scanning direction refers to the direction perpendicular to the direction of rotation of the photoconductor drum, i.e., the direction in which a scan with a laser for exposure is performed.

The relative gamma correction characteristics storage unit 115 stores the relative gamma correction characteristics for each position in the main scanning direction. For example, the relative gamma correction characteristics storage unit 115 handles a predetermined number of pixels continuous in the main scanning direction as one area and stores the relative gamma correction characteristics for each area. The gamma correction processing unit 111 selectively refers to the relative gamma correction characteristics corresponding to the printing position information included in the print information, which are stored in the relative gamma correction characteristics storage unit 115.

The gamma correction processing unit 111 outputs the gamma-corrected data and the screen type to the halftone processing unit 112.

The halftone processing unit 112 generates halftone image data from the input gamma-corrected data by using the screen in accordance with the input screen type and outputs the halftone image data to the image forming unit 121. The image forming unit 121 performs the image forming operation based on the halftone image data input from the halftone processing unit 112.

[Density Fluctuation Detection Mode]

The density fluctuation detection mode is a mode in which in the case where the output density (input/output characteristics) for the input gradation value fluctuates due to the change in the state (the change in the environment, the change with the passage of time, the change in the durability, etc.), the reference gamma correction characteristics stored in the reference gamma correction characteristics storage unit 114 are updated in order to correct the density fluctuations. In the case where a command signal to make a transition into the density fluctuation detection mode is input from a CPU, not shown schematically, or another control unit, the image forming apparatus 1 makes a transition into the density fluctuation detection mode. As the timing of transition into the density fluctuation detection mode, mention is made of, for example, timing at the time of turning on the image forming apparatus 1, timing at the time of elapse of a predetermined time, timing at the time of instructions from a printer user, etc.

After making a transition into the density fluctuation detection mode, the density fluctuation detection unit 113 generates a patch image for density measurement. The gamma correction processing unit 111 generates gamma-corrected data by performing gamma correction processing for the image data of the patch image for density measurement. The halftone processing unit 112 generates halftone image data from the gamma-corrected data.

The image forming unit 121 forms a patch image for density measurement based on the halftone image data and the density measurement unit 122 measures the density of the patch image for density measurement by measuring the formed patch image for density measurement by a density sensor.

The density fluctuation detection unit 113 calculates a difference between the density measured by the density measurement unit 122 and the target density stored in advance (i.e., the amount of density fluctuations). In the case of determining that the calculated amount of density fluctuations is larger than a predetermined value, the density fluctuation detection unit 113 updates the reference gamma correction characteristics within the reference gamma correction characteristics storage unit 114 by reference gamma correction characteristics generated newly so as to cancel out the amount of density fluctuations.

[Relative Gamma Characteristics Detection Mode]

The relative gamma characteristics detection mode is a mode in which the relative gamma correction characteristics for correcting unevenness in density that occurs within the printing surface, which are stored in the relative gamma correction characteristics storage unit 115, are updated. As will be described later, there is a case where the spot shape of the laser for exposure on the surface of the photoconductor drum is different for different printing positions in the main scanning direction depending on the optical characteristics. Because of this, there is a case where unevenness in density occurs within the printing surface. In the relative gamma characteristics detection mode, processing to update the relative gamma correction characteristics for correcting the unevenness in density such as this is performed. The relative gamma correction characteristics are characteristics of each area obtained by dividing the printing position in the main scanning direction into a plurality of areas. In the case where a command signal to make a transition into the relative gamma characteristics detection mode is input from a CPU, not shown schematically, or another control unit, the image forming apparatus 1 makes a transition into the relative gamma characteristics detection mode. As the timing of transition into the relative gamma characteristics detection mode, mention is made of, for example, timing at the time of turning on the image forming apparatus 1, timing at the time of elapse of a predetermined time, timing at the time of instructions from a printer user, etc.

After making a transition into the relative gamma characteristics detection mode, the by-position gradation characteristics detection unit 116 generates a gradation patch image the gradation of which changes in the sub scanning direction at positions corresponding to a plurality of areas in the main scanning direction. The gamma correction processing unit 111 performs gamma correction processing for the gradation patch image and outputs the gamma-corrected data to the halftone processing unit 112. The halftone processing unit 112 generates halftone image data from the gamma-corrected data and outputs the halftone image data to the image forming unit 121.

The image forming unit 121 forms a gradation patch image based on the halftone image data of the gradation patch image. The image reading unit 123 acquires gradation characteristics data for each predetermined printing position in the main scanning direction by reading the formed gradation patch image by an image sensor and outputs the acquisition results to the by-position gradation characteristics detection unit 116.

The by-position gradation characteristics detection unit 116 creates relative gamma correction characteristics for each predetermined printing position in the main scanning direction from the acquired gradation characteristics data for each printing position. Then, the by-position gradation characteristics detection unit 116 updates the relative gamma correction characteristics stored by the relative gamma correction characteristics storage unit 115 by the created relative gamma correction characteristics. The relative gamma correction characteristics are gamma correction characteristics for performing relative correction between the reference gamma correction characteristics at the printing position that serves as a reference and the gamma characteristics at each predetermined printing position. Details will be described later.

In the following, details of the operation of the image forming apparatus 1 are explained for each operation mode.

<Detailed Operation of Normal Printing Mode>

Figure 2:
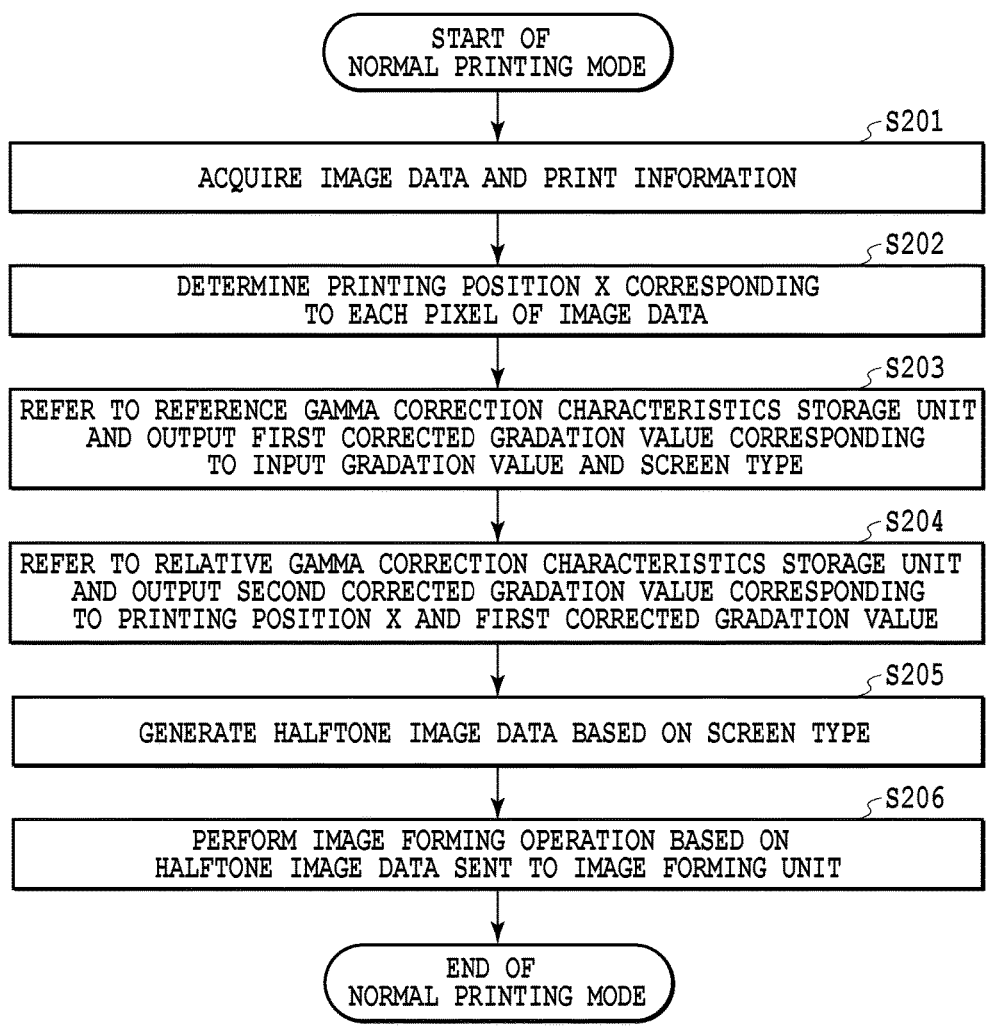
FIG. 2 is a flowchart explaining a normal printing mode in the first embodiment.

FIG. 2 is a flowchart showing the operation of the image forming apparatus 1 in the normal printing mode. The processing in FIG. 2 is implemented by a CPU, not shown schematically, reading a program stored in the storage unit, not shown schematically, inside the image forming apparatus 1 and executing the program.

First, at step S201, the gamma correction processing unit 111 acquires the input image data and print information attached to the input image data. As described previously, the print information includes the screen type and the printing position information indicating the printing position of a pixel of the image data.

Next, at step S202, the gamma correction processing unit 111 determines a pixel position X in the main scanning direction for each pixel of the image data based on the printing position information acquired at S201. It may also be possible to acquire information indicating, for example, the printing medium size, the orientation of print, the page layout, etc., as the printing position information and to perform processing to determine the pixel position X in the main scanning direction for each pixel of the image data from the information.

Next, at step S203, the gamma correction processing unit 111 refers to the reference gamma correction characteristics storage unit 114 based on the pixel value of the image data acquired at S201, i.e., the input gradation value, and the screen type acquired at S201 and outputs a first corrected gradation value. The gamma correction processing unit 111 performs processing at step S203 for each pixel configuring the image data.

FIG. 3 shows a reference gamma correction table, which is an example of the reference gamma correction characteristics stored by the reference gamma correction characteristics storage unit 114. The numerical value within the frame indicates a corrected gradation value (first corrected gradation value) corresponding to an input gradation value. In FIG. 3, input gradation values are described with some of them being thinned. The reference gamma correction table shown in FIG. 3 is a correction table in which the input gradation value is taken to be an input and the corrected gradation value obtained by correcting the input gradation value is taken to be an output. It is possible to find a corrected gradation value for an input gradation value that is not included in the correction table by performing interpolation based on the corrected gradation values for neighboring input gradation values. For example, it is possible to find a corrected gradation value for an input gradation value between the input gradation values 0 and 15 by performing interpolation based on the corrected gradation values found for the input gradation values 0 and 15, respectively. As shown in FIG. 3, the reference gamma correction table is stored in accordance with the screen type. Further, in the case of color printing, it may also be possible to store the correction table for each color material.

Figure 4:
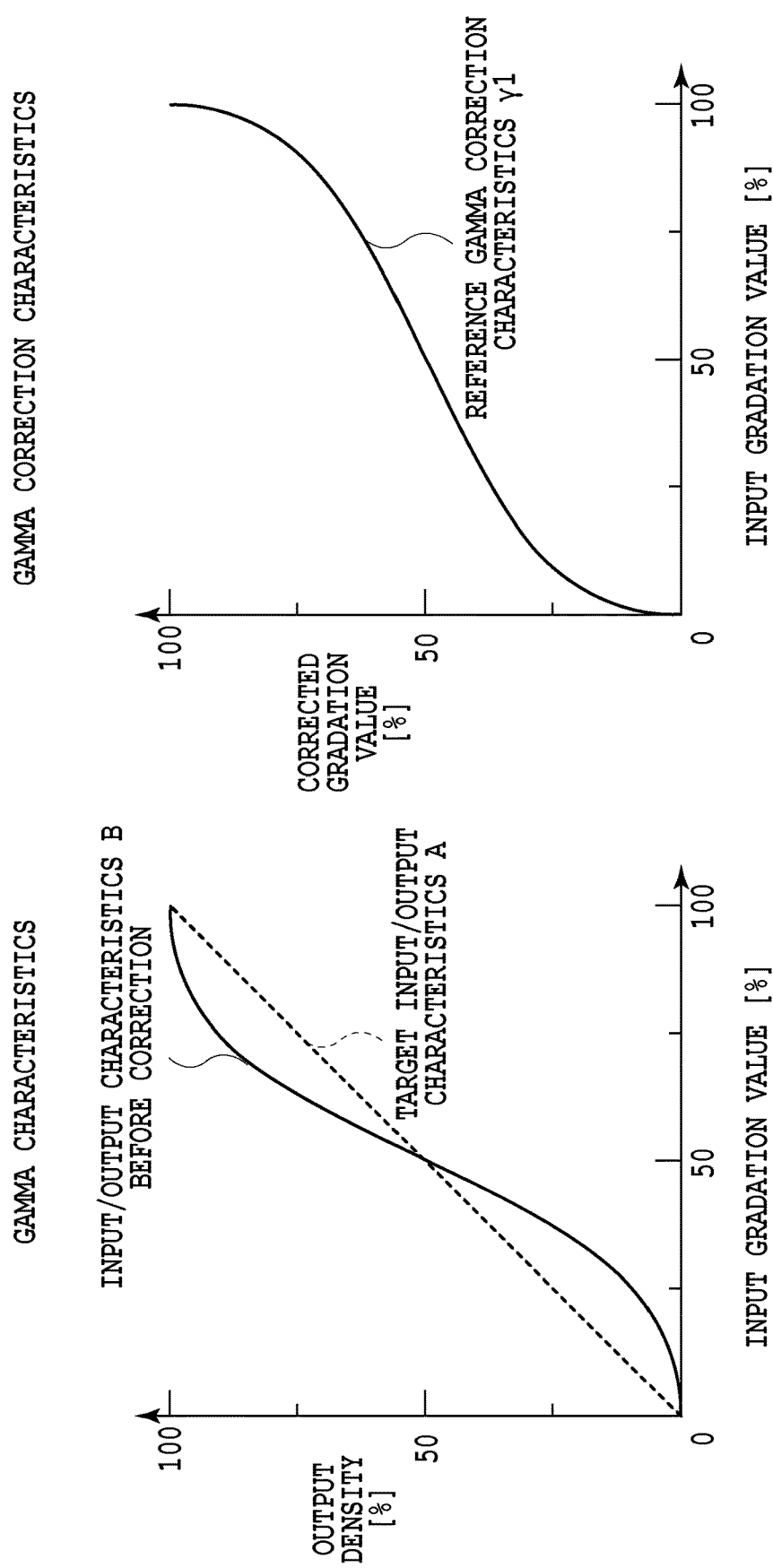
FIG. 4A is a graph explaining reference gamma correction characteristics in the first embodiment.
FIG. 4B is a graph explaining the reference gamma correction characteristics in the first embodiment.

FIG. 4A is a graph representing gamma characteristics in which the horizontal axis represents the gradation value (input gradation value) of image data that is input to the image processing controller 11 and the vertical axis represents the output density of an image that is output from the printer engine 12. Here, the target input/output characteristics are taken to be input/output characteristics A. In contrast to this, the input/output characteristics having nonlinear characteristics for the input gradation value due to the process characteristics (development efficiency or the like) of the printer engine 12 are taken to be input/output characteristics B. In the present embodiment, the input/output characteristics B are the input/output characteristics at a pixel position L that can be measured by the density measurement unit 122.

Reference gamma correction characteristics γ1 are gamma correction characteristics for putting the input/output characteristics B at the pixel position L close to the target input/output characteristics A. FIG. 4B is a graph representing gamma correction characteristics in which the horizontal axis represents the gradation value (input gradation value) of image data that is input to the image processing controller 11 and the vertical axis represents the corrected gradation value that is output. The values shown in FIG. 4B are values corresponding to the input gradation values and the output gradation values of the reference gamma correction table shown in FIG. 3. The solid line curve in FIG. 4B indicates the reference gamma correction characteristics γ1. By converting image data by using the correction characteristics, it is possible to substantially match the input/output characteristics B having nonlinear characteristics shown in FIG. 4A with the target input/output characteristics A. That is, in the case where an image is formed in the image forming unit 121 with the corrected gradation value as an input, an image with the output density of the characteristics substantially the same as the target input/output characteristics A is formed as a result.

As described above, by using the reference gamma correction characteristics γ1, it is possible to substantially match the input/output characteristics at the pixel position L that serves as a reference position with the target input/output characteristics. On the other hand, there is a case where unevenness in density occurs depending on the pixel position in the main scanning direction as described previously. Consequently, processing to find a second corrected gradation value based on the relative gamma correction characteristics is performed for the corrected gradation value (first corrected gradation value) obtained for each pixel of the image data.

Returning to FIG. 2 and explanation is continued. Next, at step S204, the gamma correction processing unit 111 refers to the relative gamma correction characteristics storage unit 115. Then, the gamma correction processing unit 111 outputs a second corrected gradation value of each pixel based on the printing position X of each pixel acquired at step S202 and the first corrected gradation value of each pixel acquired at step S203. That is, the gamma correction processing unit 111 refers to the relative gamma correction characteristics and outputs the second corrected gradation value corresponding to the printing position X and the input first corrected gradation value for each pixel.

Figure 5:
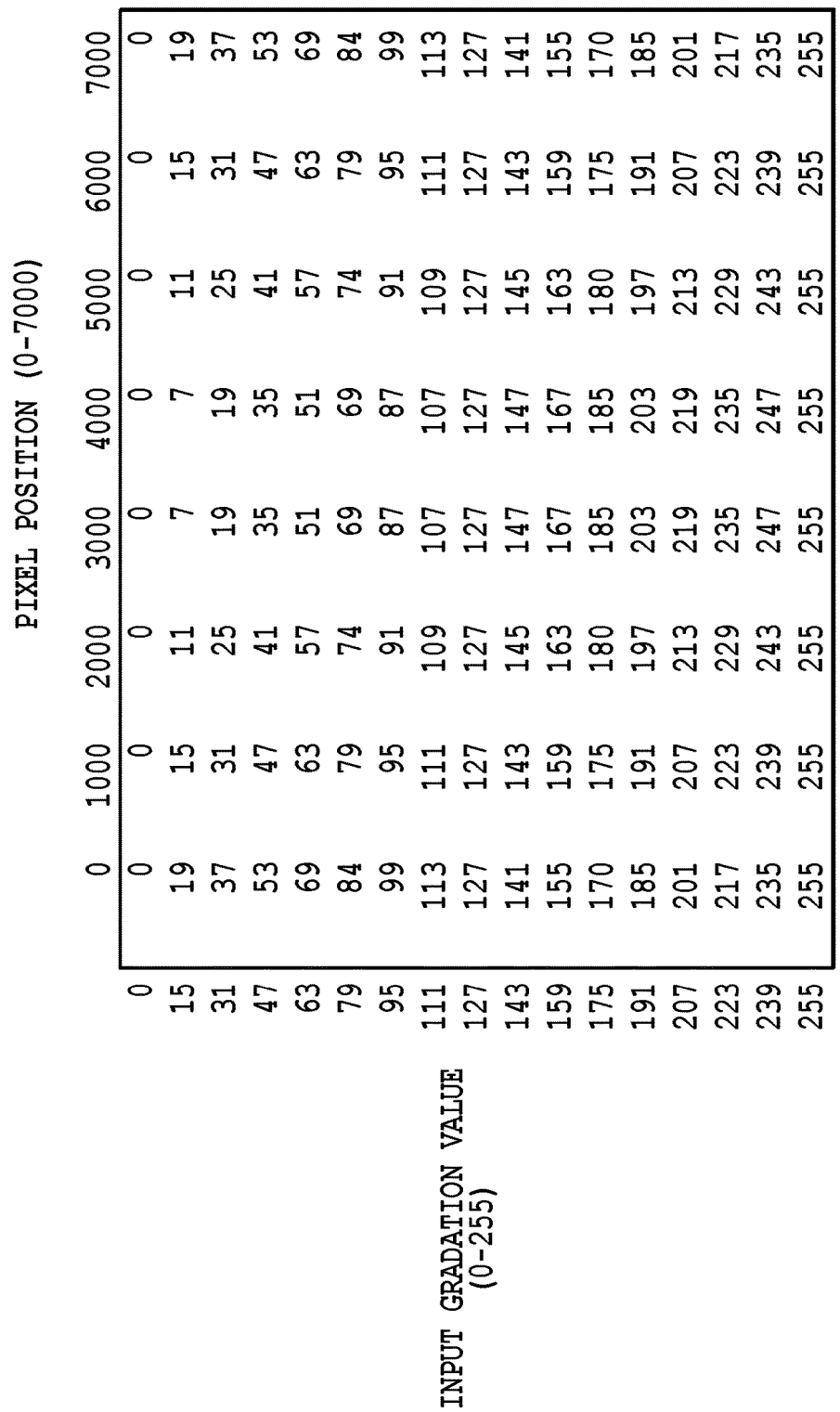
FIG. 5 is a diagram explaining a relative gamma correction characteristics storage unit in the first embodiment.

FIG. 5 shows a relative gamma correction table, which is an example of the relative gamma correction characteristics stored by the relative gamma correction characteristics storage unit 115. The numerical value within the frame indicates a corrected gradation value (second corrected gradation value). In the present embodiment, an example is explained in which the number of pixels in the main scanning direction is 7,000. Further, the case of a configuration is explained where the gradation range of each color is 0 to 255, i.e., image data is represented by eight bits. In FIG. 5, pixel positions and input gradation values are described with some of them being thinned. The relative gamma correction table shown in FIG. 5 indicates the corrected gradation value (second corrected gradation value) obtained by correcting the input gradation value (first corrected gradation value) in the case where the pixel position X in the main scanning direction and the input gradation value (first corrected gradation value) at the pixel position X are input. It is possible to find the corrected gradation value for the pixel position of interest and the input gradation value that are not described in the correction table by performing interpolation based on the corrected gradation values for a plurality of neighboring pixel positions and a plurality of neighboring input gradation values. For example, it is possible to find the corrected gradation value for the pixel position of interest located between the pixel positions 0 and 1000 by performing interpolation based on the corrected gradation values found for the pixel positions 0 and 1000, respectively.

Further, it is possible to find the corrected gradation value for the input gradation value between the input gradation values 0 and 15 by performing interpolation based on the corrected gradation values found for the input gradation values 0 and 15, respectively. In the case of color printing, it may also be possible to store the correction table for each color material.

Figure 6A:
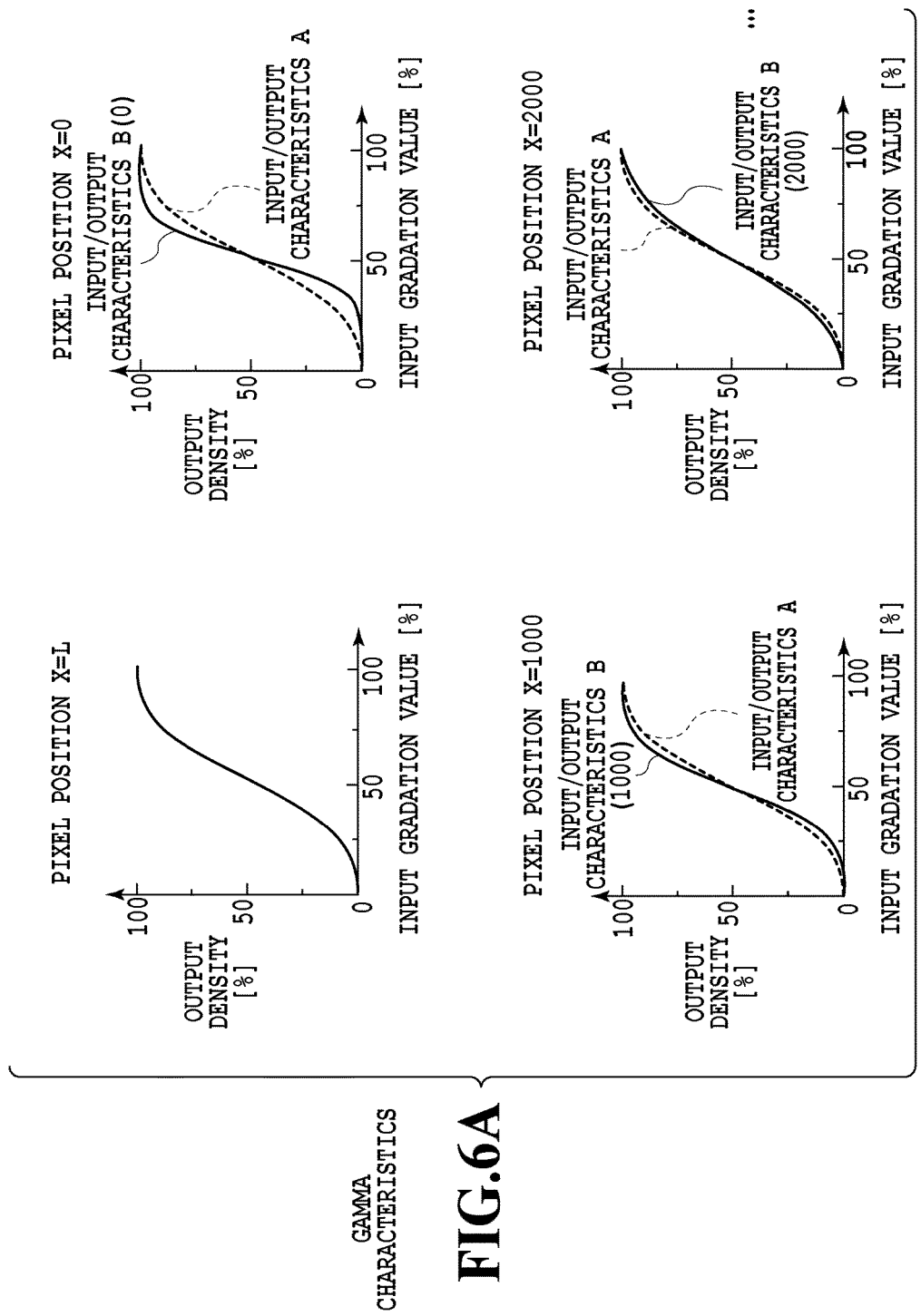
FIG. 6A is a graph explaining relative gamma correction characteristics in the first embodiment.

FIG. 6A is a graph representing gamma characteristics in which the horizontal axis represents the gradation value of image data that is input to the image processing controller 11 and the vertical axis represents the output density of an image that is output from the printer engine 12. Here, the target input/output characteristics are taken to be the input/output characteristics A. In the present embodiment, the input/output characteristics at the pixel position L (reference pixel position) that can be measured by a density sensor are taken to be the target input/output characteristics A.

In contrast to this, the input/output characteristics having density fluctuations in the case where the optical characteristics (spot shape of light beam or the like) are different for each main scanning position are taken to be the input/output characteristics B. Relative gamma correction characteristics γ2 are gamma correction characteristics for putting the input/output characteristics B close to the target input/output characteristics A.

Figure 6B:
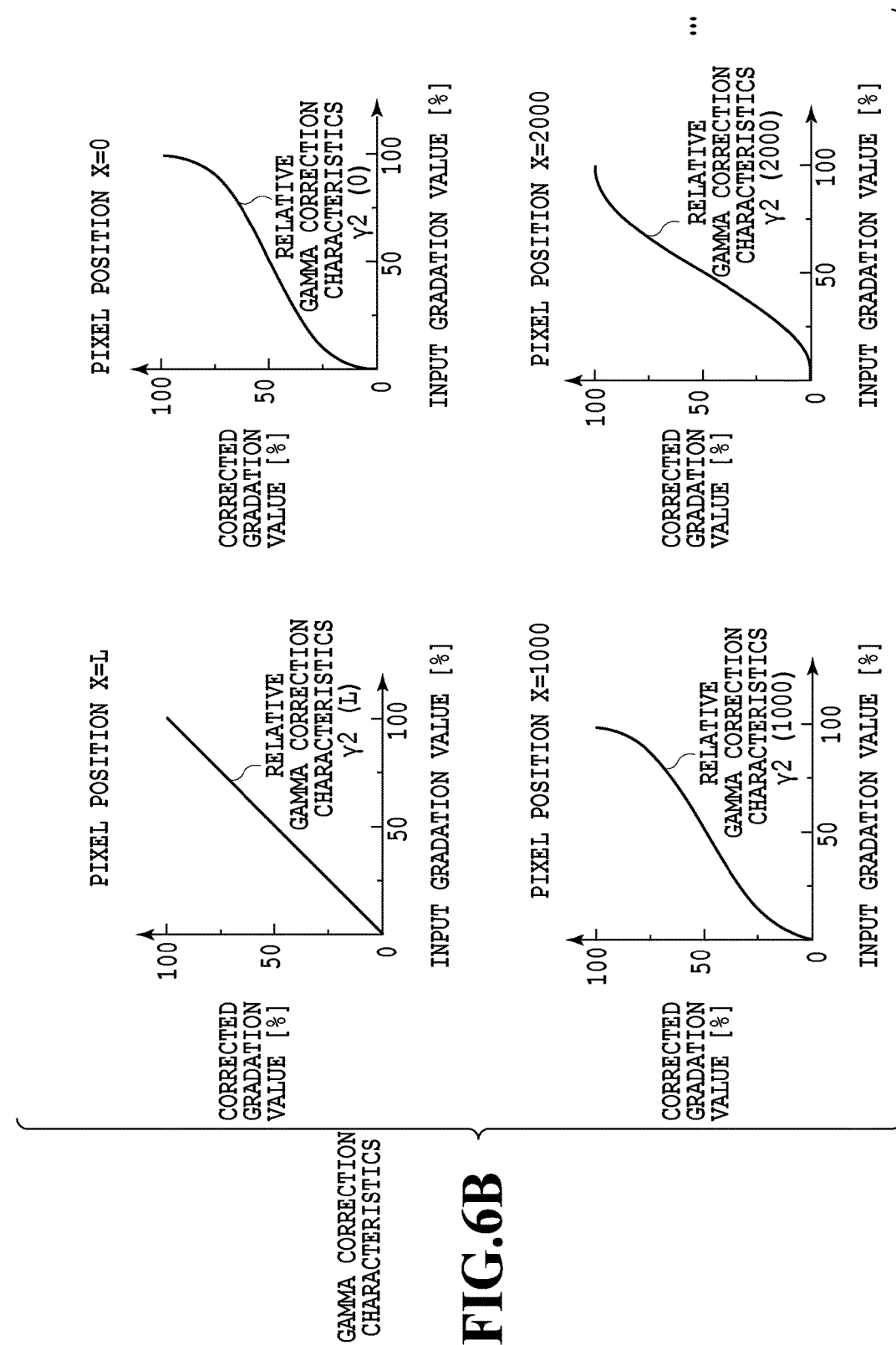
FIG. 6B is a graph explaining the relative gamma correction characteristics in the first embodiment.

FIG. 6B is a graph representing gamma correction characteristics in which the horizontal axis represents the gradation value (i.e., the first corrected gradation value) of image data that is input to the relative gamma correction table and the vertical axis represents the corrected gradation value (second corrected gradation value) that is output. The solid line curve indicates the relative gamma correction characteristics γ2. At the pixel position L, the gamma correction characteristics are the input/output characteristics themselves at the reference pixel position itself, and therefore, the graph is linear. On the other hand, at the pixel positions different from the reference pixel position, the gamma correction characteristics are those which cancel out the density fluctuations due to the optical characteristics. By correcting image data by using the correction characteristics, it is possible to substantially match the input/output characteristics B having nonlinear characteristics shown in FIG. 6A with the target input/output characteristics A at the reference pixel position.

As explained previously, the relative gamma correction characteristics are correction characteristics for substantially matching the input/output characteristics at the position different from the reference pixel position L with the input/output characteristics at the reference pixel position. Then, as the input gradation value for the relative gamma correction characteristics, the first corrected gradation value obtained as the results of performing gamma correction that takes into consideration the state fluctuations, such as environmental fluctuations, at the reference pixel position L. According to the processing such as this, it is possible to reduce the number of gamma correction characteristics that are stored while suppressing unevenness in density within the printing surface. That is, while the patch image is formed for each pixel position and the reference gamma correction characteristics in terms of the present embodiment are prepared for each pixel position conventionally, in the present embodiment, it is made possible to suppress unevenness in density within the printing surface while reducing the number of reference gamma correction characteristics.

The gamma correction processing unit calculates the second corrected gradation value corresponding to the first corrected gradation value of each pixel and outputs the gamma-corrected data including the second corrected gradation values and the screen type to the halftone processing unit 112.

Next, at S205, the halftone processing unit 112 performs area gradation processing based on the screen type for the gamma-corrected data and generates halftone image data.

Next, at S206, the image forming unit 121 performs the image forming operation based on the halftone image data and the normal printing mode is terminated.

As described above, in the image forming apparatus of the present embodiment, the reference gamma correction characteristics stored in the reference gamma correction characteristics storage unit 114 and the relative gamma correction characteristics for each printing position stored in the relative gamma correction characteristics storage unit 115 are used. By using these, the input/output characteristics that are nonlinear due to the process characteristics or the like of the printer engine 12 and the density fluctuations different for each pixel position in the main scanning direction are corrected. Because of this, it is possible to improve the nonlinear input/output characteristics and the unevenness in density within the printing surface across the entire gradation area. Further, at this time, typically, one measurement sensor for measuring density fluctuations in accordance with the state fluctuations, such as environmental fluctuations, and one patch image for density measurement are sufficient, and therefore, it is possible to reduce the number of parts and save the color materials at the time of patch measurement.

<Relationship Between Optical Characteristics and Output Density>

FIG. 7A and FIG. 7B are each a schematic diagram showing a toner attachment ratio of halftone dots in the case where the optical characteristics (spot shape of light beam) are different for each main scanning position due to distortion caused by the manufacturing error and the assembling error of constituent parts and supports. As an example, a case is supposed where the amount of blurring of the optical characteristics is small at the center in the main scanning direction and the amount of blurring of the optical characteristics is large at the end in the main scanning direction. Of course, the example is not limited to this and in the case where the optical characteristics are different for each main scanning position, any aspect may be accepted. The case where the amount of blurring of the optical characteristics is large refers to a case where such a phenomenon occurs in which, for example, the spot shape of light beam spreads in the main scanning direction compared to the case where the amount of blurring is small and the number of peaks of the quantity of light decreases.

FIG. 7A shows fluctuations in the toner attachment ratio in the case where the input gradation value is included in the highlight portion. The solid line curve in FIG. 7A indicates a toner attachment ratio THa in the case where the amount of blurring of the optical characteristics is small. The dot line curve indicates a toner attachment ratio THb in the case where the amount of blurring of the optical characteristics is large. Even though the input gradation value is the same (digital image is the same), in the case where the state of the spot shape is different, the average of the toner attachment ratio fluctuates (here, THa>THb). From the macro viewpoint of the change in density at this time, as shown in FIG. 7A, the density is high in the case where the amount of blurring is small (THa). On the other hand, FIG. 7B shows fluctuations in the toner attachment ratio in the case where the input gradation value is included in the shadow portion. The solid line curve indicates a toner attachment ratio TSa in the case where the amount of blurring of the optical characteristics is small. The dot line curve indicates a toner attachment ratio TSb in the case where the amount of blurring of the optical characteristics is large. As in FIG. 7A, even though the input gradation value is the same (digital image is the same), in the case where the state of the spot shape is different, the average of the toner attachment ratio fluctuates (here, TSa<TSb). From the macro viewpoint of the change in density at this time, as shown in FIG. 7B, the density is low in the case where the amount of blurring is small (TSa).

Figure 8:
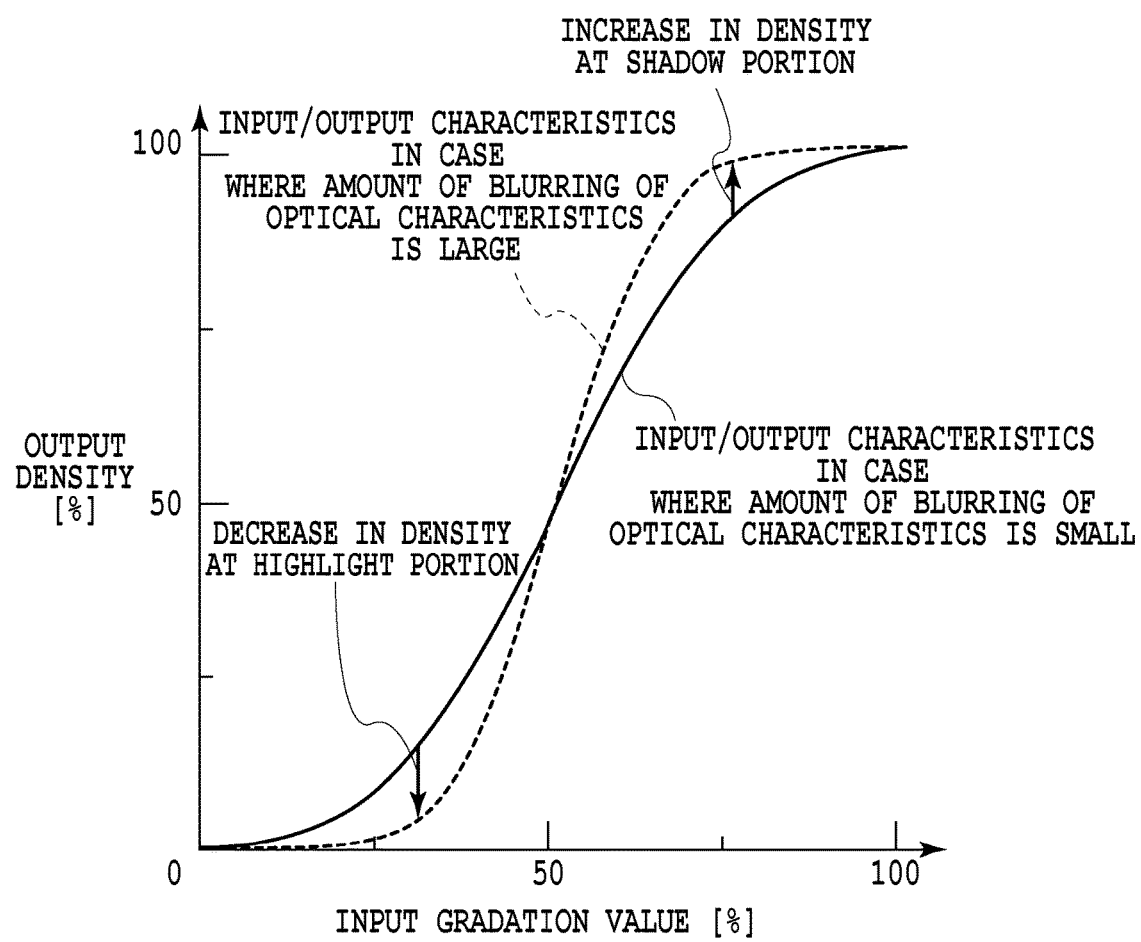
FIG. 8 is a graph explaining a relationship between the optical characteristics and input/output characteristics in the first embodiment.

FIG. 8 is a graph representing gamma characteristics in which the horizontal axis represents the gradation value of image data that is input to the image processing controller 11 and the vertical axis represents the output density of an image that is output from the printer engine 12. The solid line curve indicates the input/output characteristics in the case where the amount of blurring of the optical characteristics is small. On the other hand, the dot line curve indicates the input/output characteristics in the case where the amount of blurring of the optical characteristics is large. As shown in FIG. 8, in the case where the amount of blurring of the optical characteristics is large, the density at the shadow portion increases and the density at the highlight portion decreases compared to the case where the amount of blurring of the optical characteristics is small. This represents the same input/output characteristics as those explained in FIG. 7A and FIG. 7B. In the vicinity of the input gradation value 50%, the input/output characteristics are substantially the same. As described above, it is possible to confirm that the fluctuations in the input/output characteristics due to the optical characteristics cause the difference in the way gamma rises.

<Relationship Between Output Density Fluctuations and Toner Image>

Figure 9C:
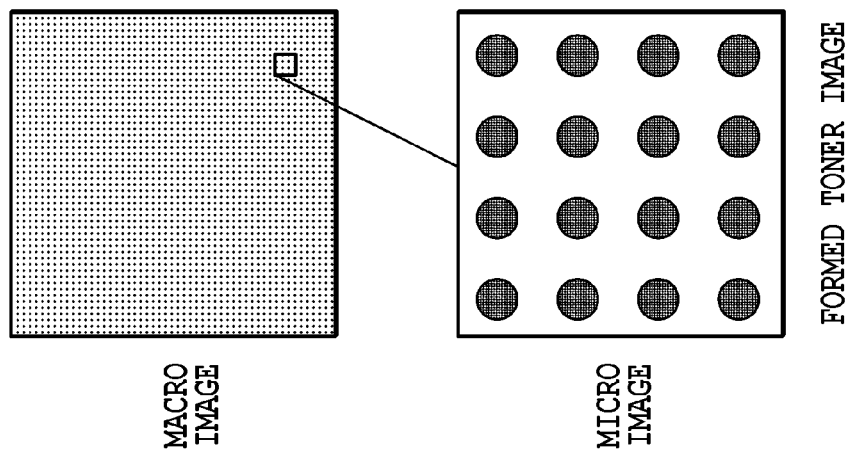
FIG. 9C is a diagram explaining a relationship between the optical characteristics and a toner image in the first embodiment.
Figure 9B:
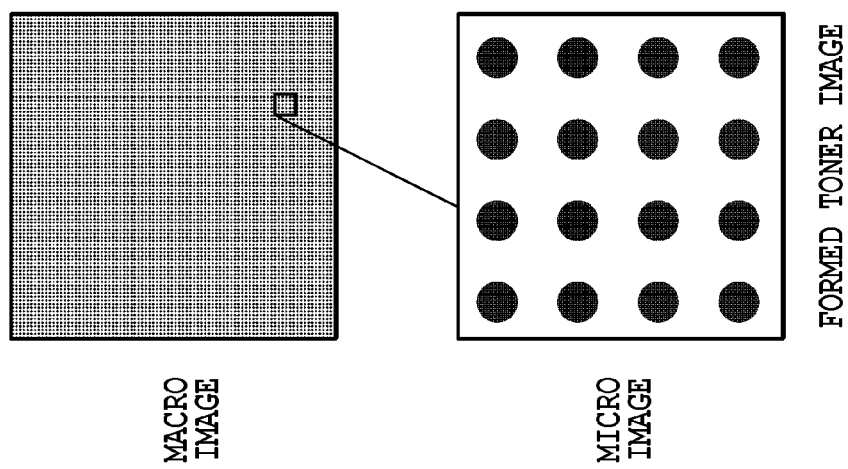
FIG. 9B is a diagram explaining a relationship between the optical characteristics and a toner image in the first embodiment.
Figure 9A:
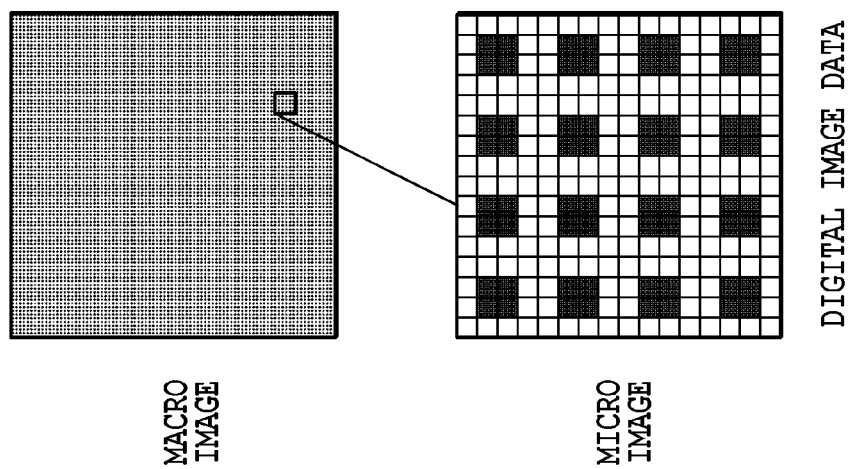
FIG. 9A is a diagram explaining a relationship between the optical characteristics and a digital image data in the first embodiment.

Here, the correlation between output density fluctuations and a toner image is explained with referent to FIG. 9A to FIG. 9C. FIG. 9A shows digital image data that reproduces a highlight portion. FIG. 9B is a macro image and a micro toner image formed from the digital image data in FIG. 9A in the case where the amount of blurring of the optical characteristics is small indicated by the solid line in FIG. 8. FIG. 9C is a macro image and a micro toner image formed from the digital image data in FIG. 9A in the case where the amount of blurring of the optical characteristics is large indicated by the dot line in FIG. 8. At this time, from the micro viewpoint, it is known that the toner attachment ratio decreases within the dot of the toner image by the change from the state in FIG. 9B into the state in FIG. 9C. Consequently, from the macro viewpoint, the density decreases. This means that in the case where the amount of blurring of the optical characteristics is large at the highlight portion, the larger the area of dot of the toner image, the more the amount of toner that is not attached within the dot increases compared to the case where the amount of blurring of the optical characteristics is small. That is, it is possible to assume that the area of dot of the toner image and amount of fluctuations in macro density at the time of fluctuations in the optical characteristics have a relative relationship. Here, the fluctuations in the optical characteristics are not caused by the fluctuations with the passage of time but caused by the fluctuations in the scanning position in the main scanning direction.

Here, it is possible approximate the area ratio between the dot and the background in the toner image as the macro density, and therefore, it is made possible to hold the amount of fluctuations in the macro density at the time of fluctuations in the optical characteristics as the relative characteristics between the macro densities. That is, it is possible to store as the relative gamma correction characteristics as described previously. The relative gamma correction characteristics do not depend on the reference gamma characteristics, which are the relationship between the input gradation value and the output density. The reason is that in the case where the optical characteristics of the reference gamma correction characteristics are taken to be a reference, the relative gamma correction characteristics are the relative characteristics between the macro density of the reference gamma correction characteristics and the macro density of the other optical characteristics. Because of this, in the present embodiment, the reference gamma correction characteristics that fluctuate depending on the change in the process characteristics and the screen type, and the relative gamma correction characteristics that depend on the fluctuations in the macro density at the time of fluctuations in the optical characteristics are stored separately. Due to this, in the image forming apparatus 1 of the present embodiment, it is made possible to use the same relative gamma correction characteristics for a plurality of reference gamma correction characteristics. That is, in the case where the reference gamma correction characteristics are updated in the density fluctuation detection mode as described previously, it is made possible to use the same relative gamma correction characteristics for both the reference gamma correction characteristics before updating and the reference gamma correction characteristics after updating. Further, compared to the case where the gamma correction characteristics are stored for each position in the main scanning direction for each screen type, it is possible to reduce the number of gamma correction characteristics to be stored. For example, while it is necessary to store the gamma correction characteristics in the number corresponding to the number of screen types×the number of positions in the main scanning direction (number of spot diameters of light beams) conventionally, now it is sufficient to store the gamma correction characteristics in the number corresponding to the number of screen types+the number of positions in the main scanning direction (number of spot diameters of light beams). Consequently, it is possible to reduce the capacity of the memory storing the gamma correction table while implementing suppression of unevenness in density within the printing surface.

<Detailed Operation in Density Fluctuation Detection Mode>

Figure 10A:
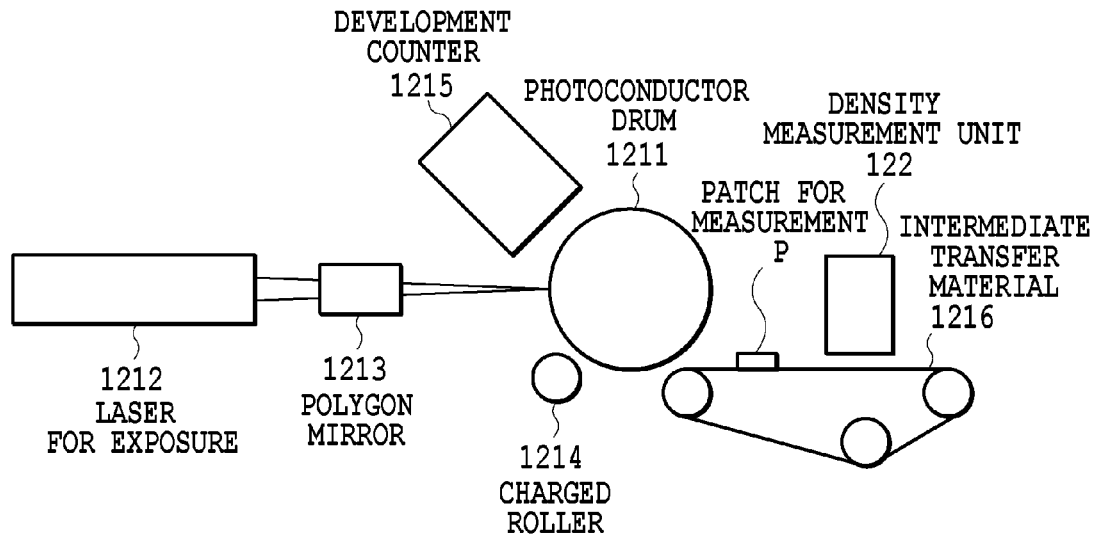
FIG. 10A is a diagram showing a configuration of a density fluctuation detection mode in the first embodiment.
Figure 10B:
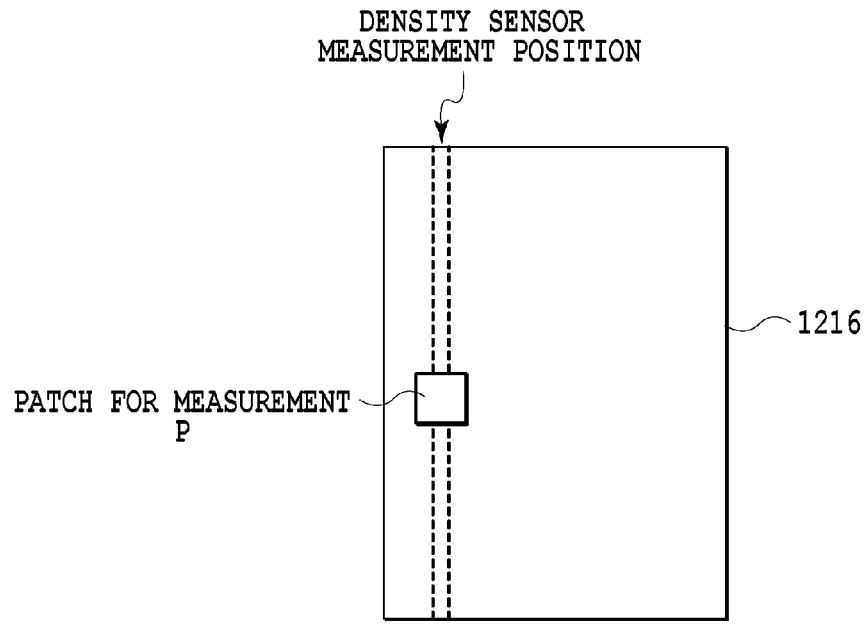
FIG. 10B is a diagram showing a configuration of the density fluctuation detection mode in the first embodiment.

FIG. 10A and FIG. 10B are diagrams showing an example of the configuration of the printer engine 12 in the density fluctuation detection mode. The printer engine 12 shown in FIG. 10A includes a photoconductor drum 1211, a laser for exposure 1212, a polygon mirror 1213, a charged roller 1214, a development counter 1215, an intermediate transfer material 1216, and the density measurement unit 122. First, the image forming apparatus charges the surface of the photoconductor drum 1211 by the charged roller 1214 and creates an electrostatic latent image on the surface of the photoconductor drum 1211 by the laser for exposure 1212 and the polygon mirror 1213. Next, the image forming apparatus forms a toner image of a patch image P for density measurement on the photoconductor drum 1211 by the development counter 1215. Next, the image forming apparatus transfers the patch image P from the photoconductor drum 1211 onto the intermediate transfer material 1216. The density of the patch image P is measured by using a density sensor of the density measurement unit 122. The density sensor includes a light-emitting element (not shown schematically) and a light-receiving element (not shown schematically) and measures the density of the patch image P by irradiating the patch image P with light from the light-emitting element and receiving the reflected light by the light-receiving element.

Here, as shown in FIG. 10B, the patch image P is formed at a position where measurement is possible by the density measurement unit 122 on the surface of the intermediate transfer material. In the present embodiment, explanation is given by supposing one patch image for density measurement that is generated in the density fluctuation detection mode, but the number of patch images that are generated is not limited to this. For example, it is also possible to apply the present embodiment to a configuration in which a plurality of patch images is generated and accuracy is improved by detecting the densities thereof. Further, it is also possible to apply the present embodiment to a configuration in which a plurality of patch images is generated so as to have different gradations and the density fluctuation detection accuracy is improved by detecting the densities thereof. In the present embodiment, explanation is given by supposing one density measurement unit for density measurement, but the number of density measurement units is not limited to this. It is also possible to apply the present embodiment to a configuration in which a plurality of density measurement units is installed at a plurality of positions and accuracy is improved by detecting densities thereat.

Figure 11:
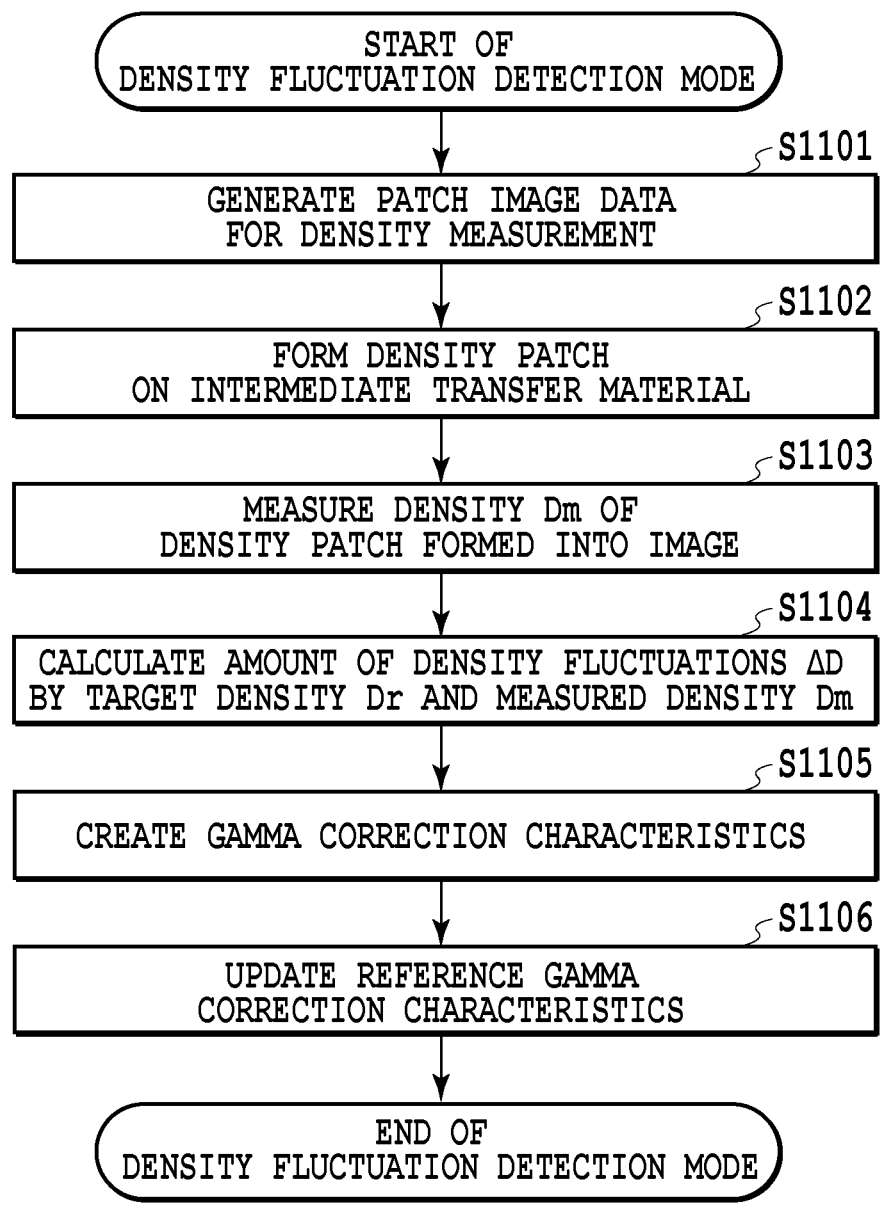
FIG. 11 is a flowchart explaining the density fluctuation detection mode in the first embodiment.

FIG. 11 is a flowchart showing the operation of the image forming apparatus 1 in the density fluctuation detection mode. The processing in FIG. 11 is implemented by a CPU, not shown schematically, reading and executing a program stored in the storage unit, not shown schematically, inside the image forming apparatus 1.

First, at step S1101, the density fluctuation detection unit 113 generates image data of a patch image for density measurement.

Next, at step S1102, the image forming unit 121 forms a patch image on the intermediate transfer material based on the image data of the patch image generated by the density fluctuation detection unit 113. As described previously, the image data of the patch image is image data for which gamma correction processing and halftone processing have been performed.

Next, at step S1103, the density measurement unit 122 measures a density Dm by measuring the patch image formed on the intermediate transfer material by a density sensor and outputs the measurement results to the density fluctuation detection unit 113.

Next, at step S1104, the density fluctuation detection unit 113 compares the density Dm measured by the density measurement unit 122 and a target density Dr stored in the density fluctuation detection unit 113 and calculates an amount of density fluctuations ΔD.

Next, in the case of determining that the amount of density fluctuations ΔD is larger than a predetermined value, the density fluctuation detection unit 113 generates new reference gamma correction characteristics in order to correct the amount of density fluctuations ΔD at step S1105. The new reference gamma correction characteristics are reference gamma correction characteristics in the case where the amount of density fluctuations ΔD is taken into consideration.

Next, at step S1106, the density fluctuation detection unit 113 updates the reference gamma correction characteristics stored in the reference gamma correction characteristics storage unit 114 by the new reference gamma correction characteristics created at step S1105 and the density fluctuation detection mode is terminated.

Figure 12:
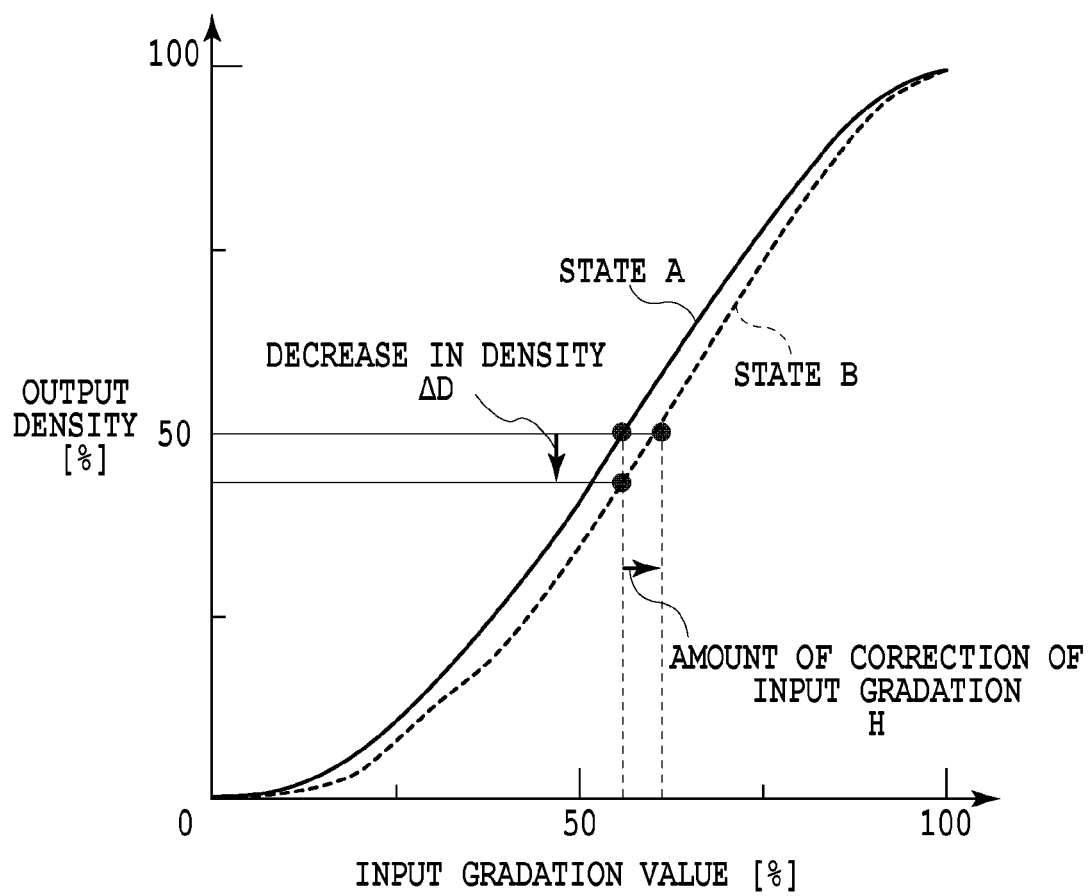
FIG. 12 is a graph explaining a relationship between state fluctuations and the input/output characteristics in the first embodiment.

FIG. 12 is a graph in which the horizontal axis represents the gradation value of image data that is input to the image processing controller 11 and the vertical axis represents the output density of an image that is output from the printer engine 12. Here, the state of the input/output characteristics in the normal state without a change in the state is taken to be a state A. In contrast to this, the current state of the input/output characteristics having density fluctuations due to some change in the state (change in the environment, change with the passage of time, change in the durability, etc.) is taken to be a state B. At this time, it is known that the output density fluctuates between the state A and the state B even though the input gradation value is the same (here, the output density decreases by ΔD in the state B compared to that in the state A). In order to correct the fluctuations in correspondence between the input gradation data and the output density, processing to update gamma correction characteristics is performed. That is, in order to obtain the same output density as that in the state A in the current state B, gamma correction characteristics in which an amount of correction H is added in advance to the input gradation value are generated as new reference gamma correction characteristics and the reference gamma correction characteristics that are stored are updated by the newly generated reference gamma correction characteristics.

<Relationship Between Fluctuations in Shape of Toner Image and Output Density Fluctuations>

Figure 13C:
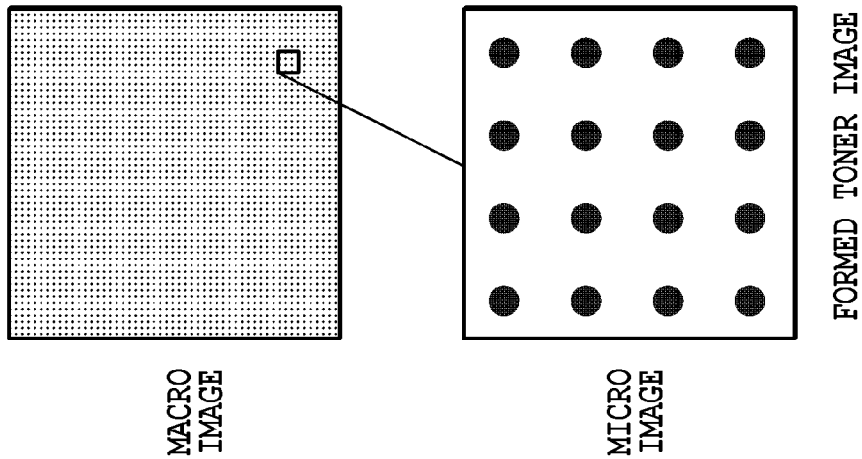
FIG. 13C is a diagram explaining a relationship between the state fluctuations and a toner image in the first embodiment.
Figure 13B:
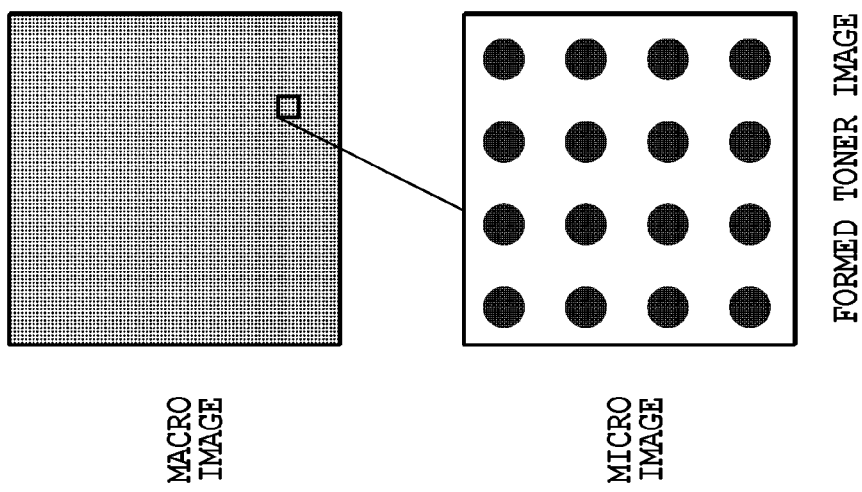
FIG. 13B is a diagram explaining a relationship between the state fluctuations and a toner image in the first embodiment.
Figure 13A:
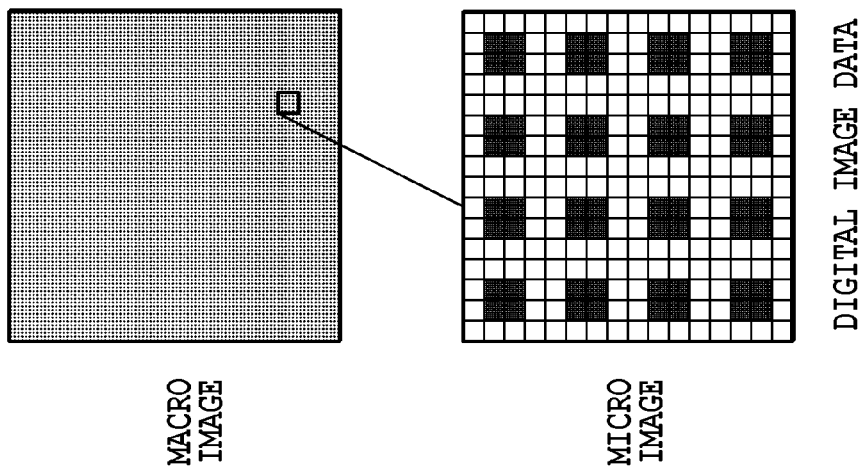
FIG. 13A is a diagram explaining a relationship between the state fluctuations and digital image data in the first embodiment.

Here, the correlation between output density fluctuations at the time of change in the state and a toner image is explained with reference to FIG. 13A to FIG. 13C. FIG. 13A shows digital image data that reproduces a highlight portion. FIG. 13B is a macro image and a micro toner image formed from the digital image data in FIG. 13A in the state A in FIG. 12. FIG. 13C is a macro image and a micro toner image formed from the digital image data in FIG. 13A in the state B in FIG. 12. At this time, from the micro viewpoint, it is possible to confirm that the area of the toner shape becomes small due to the change from the state in FIG. 13B into the state in FIG. 13C. Consequently, from the macro viewpoint, the density decreases. As described above, at the time of the change in the state, the toner shape fluctuates, and therefore, the toner image increases/decreases radially. Then, by the toner shape fluctuating, the area of the dot in the toner image fluctuates and by the area of the dot fluctuating, the density of the image from the macro viewpoint fluctuates. At this time, the tendency for the toner image to increase/decrease radially (the amount of density fluctuations) is different depending on the amount of blurring of the optical characteristics that form an image on the photoconductor drum. The smaller the amount of blurring of the optical characteristics, the shaper the electrostatic latent image to be drawn on the photoconductor drum becomes, and therefore, the formation of the toner image becomes stable and the amount of density fluctuations at the time of the state fluctuations becomes small. On the other hand, the larger the amount of blurring of the optical characteristics, the more unstable the formation of the toner image becomes, and therefore, the amount of density fluctuations at the time of the state fluctuations becomes large.

<Relationship Between Optical Characteristics and Output Density Fluctuations>

Figures 14A, 14B:
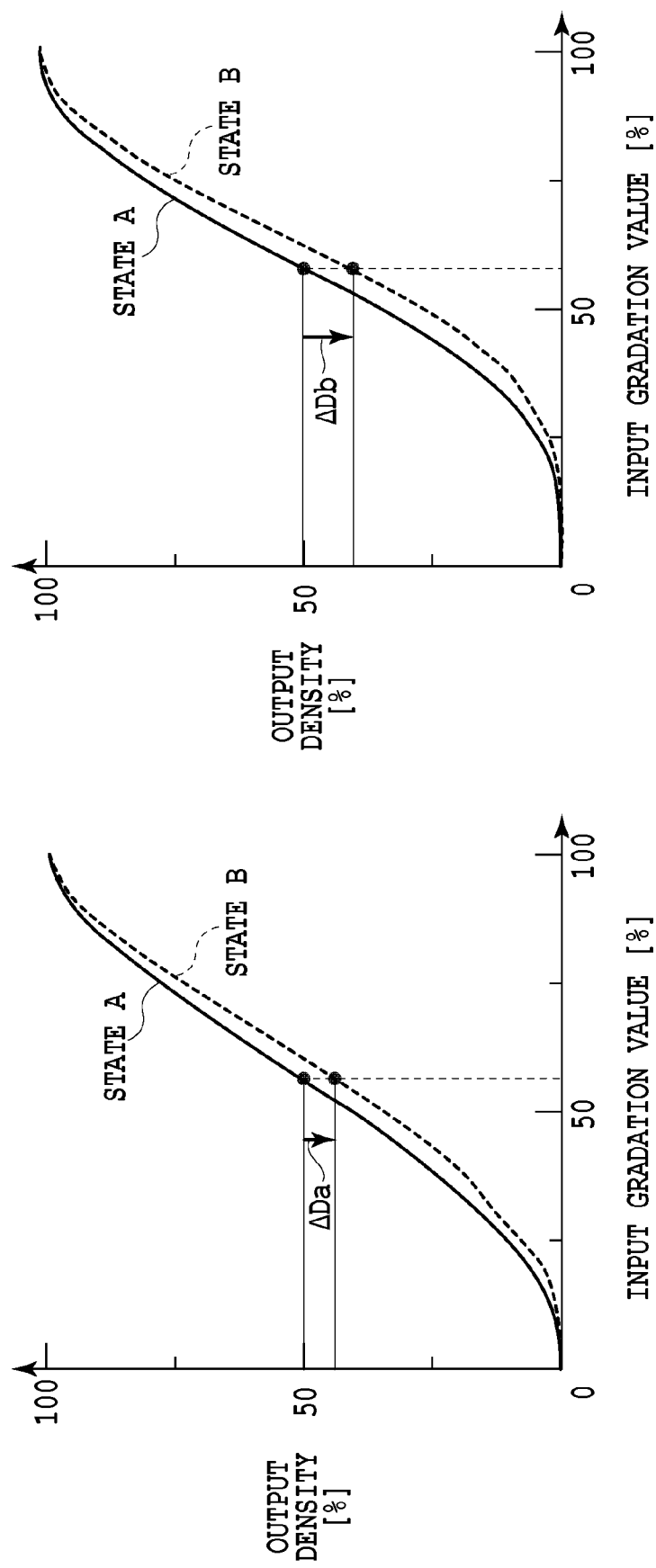
FIG. 14A is a graph explaining a relationship between the optical characteristics, the state fluctuations, and the input/output characteristics in the first embodiment.
FIG. 14B is a graph explaining a relationship between the optical characteristics, the state fluctuations, and the input/output characteristics in the first embodiment.

FIG. 14A shows fluctuations in the input/output characteristics at the time of the change in the state in the case where the amount of blurring of the optical characteristics is small. The solid line curve indicates the input/output characteristics in the state A, which is the normal state without the change in the state. In contrast to this, the dot line curve indicates the input/output characteristics in the state B having density fluctuations due to some change in the state (change in the environment, change with the passage of time, change in the durability, etc). At this time, the amount of density fluctuations due to the change in the state at a certain output density is taken to be ΔDa. On the other hand, FIG. 14B shows the fluctuations in the input/output characteristics at the time of the change in the state in the case where the amount blurring of the optical characteristics is large. The solid line curve indicates the input/output characteristics in the state A, which is the normal state without the change in the state. In contrast to this, the dot line curve indicates the input/output characteristics having the density fluctuations due to the same change in the state as that in the state B in FIG. 14A. At this time, the amount of density fluctuations due to the change in the state at a certain output density is taken to be ΔDb. In the case where the amount of blurring of the optical characteristics is different, the amount of density fluctuations is different (here, ΔDa<ΔDb) even though the same change in the state occurs as shown in FIG. 14A and FIG. 14B.

Because of this, in the conventional image forming apparatus, in order to appropriately determine the amount of correction in accordance with the amount of blurring of the optical characteristics different for each position in the main scanning direction, it is necessary to acquire the amount of density fluctuations at each position by actual measurement or prediction. Further, there is a case where the amount of density fluctuations is different depending on the process characteristics of the apparatus itself and the difference in the screen type. Because of this, it is necessary to acquire the amount of density fluctuations for each printing position for each of the fluctuations in the process characteristics and for each of a plurality of screens, and therefore, the amount of consumed toner increases as well as the time of calibration increases.

On the other hand, in the image forming apparatus 1 of the present embodiment, as described previously, the reference gamma correction characteristics that fluctuate depending on the change in the state and the screen type, and the relative gamma correction characteristics that depend on the fluctuations in the macro density at the time of fluctuations in the optical characteristics are stored separately. Due to this, in the image forming apparatus 1 of the present embodiment, it is sufficient to update only the reference gamma correction characteristics at the time of state fluctuations, and therefore, it is possible to suppress the number of times patch density measurement is performed (number of positions at which patch density measurement is performed) in calibration. Consequently, it is made possible to suppress the amount of toner to be consumed as well as reducing the number of density sensors necessary for measurement of the amount of density fluctuations and the time taken for updating of the gamma correction processing.

There is a case where the relative gamma correction characteristics differ depending on the screen type due to the difference in the pattern structure of the screen. In the case where the difference in the characteristics cannot be accepted, a configuration may be accepted in which the relative gamma correction characteristics are stored for each screen type. In this case, the capacity of the memory storing the relative gamma correction table increases, but it is possible to similarly suppress the number of times patch density measurement is performed (number of positions at which patch density measurement is performed) in calibration. Because of this, it is possible to obtain the effect that the number of sensors is reduced, the time taken for updating of gamma correction processing is reduced, and the amount of toner to be consumed is suppressed.

<Detailed Operation of Relative Gamma Characteristics Detection Mode>

Figure 15:
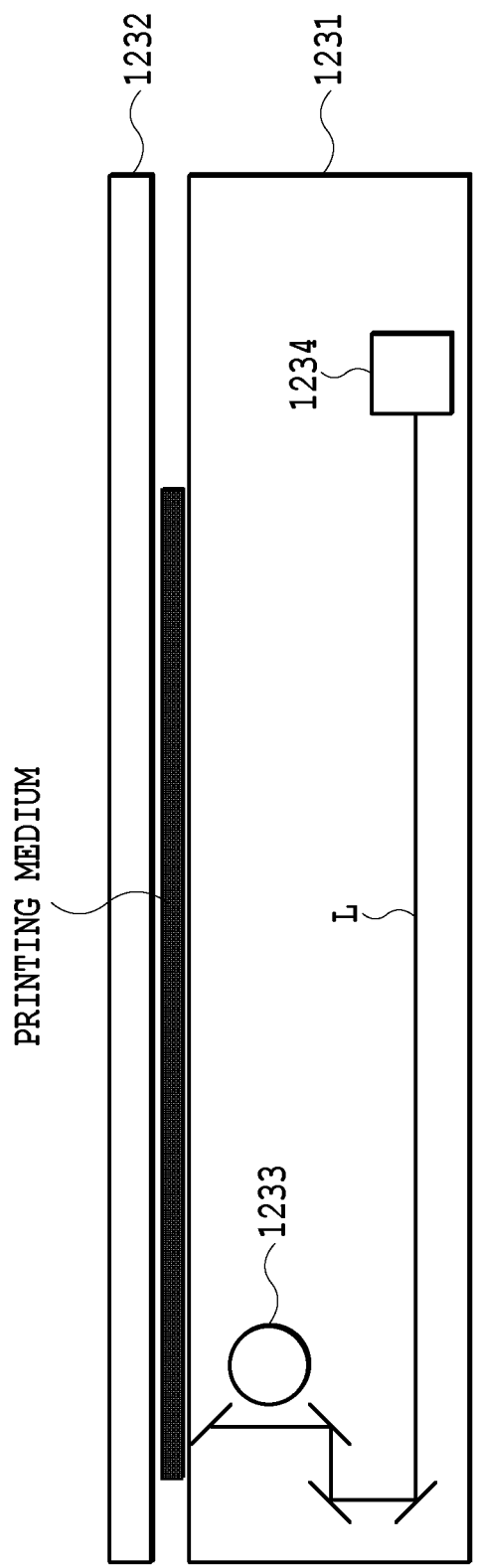
FIG. 15 is a diagram showing a configuration of an image reading unit in the first embodiment.

FIG. 15 is a diagram showing an example of the configuration of the image reading unit 123 in the relative gamma characteristics detection mode. The image reading unit 123 reads a gradation patch image printed on a printing medium sandwiched between a document table 1231 and a cover 1232. Specifically, the printing medium is irradiated with light from a light source 1233 and reflected light L is formed into an image on an image sensor 1234 by a reflection mirror, a lens, not shown schematically, etc. The gradation patch image read by the image reading unit 123 is sent to the by-position gradation characteristics detection unit 116 of the image processing controller 11.

Figure 16:
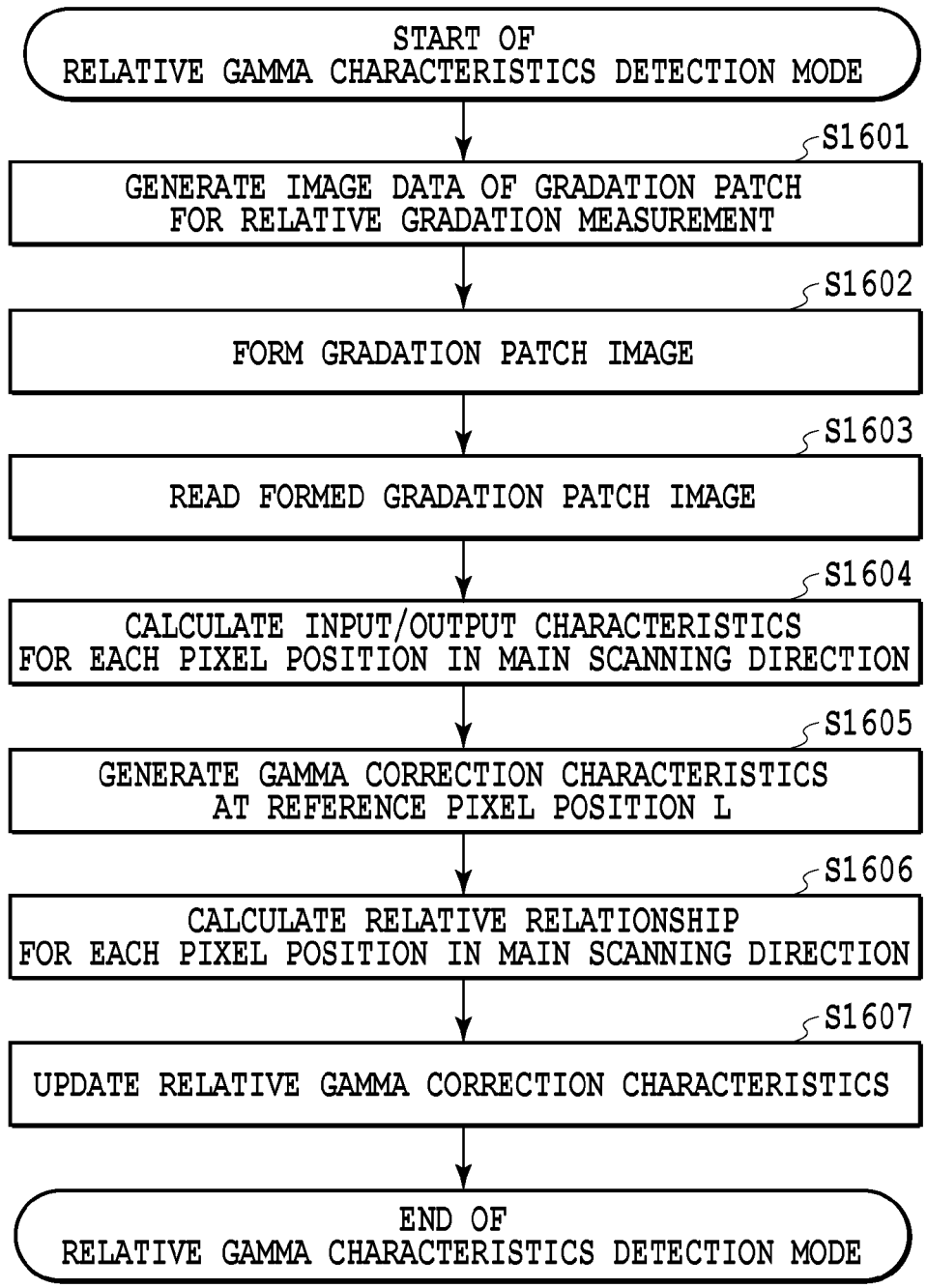
FIG. 16 is a flowchart explaining a relative gamma characteristics detection mode in the first embodiment.

FIG. 16 is a flowchart showing the operation of the image forming apparatus 1 in the relative gamma characteristics detection mode. The processing in FIG. 16 is implemented by a CPU, not shown schematically, reading and executing a program stored in the storage unit, not shown schematically, inside the image forming apparatus 1.

Figure 17:
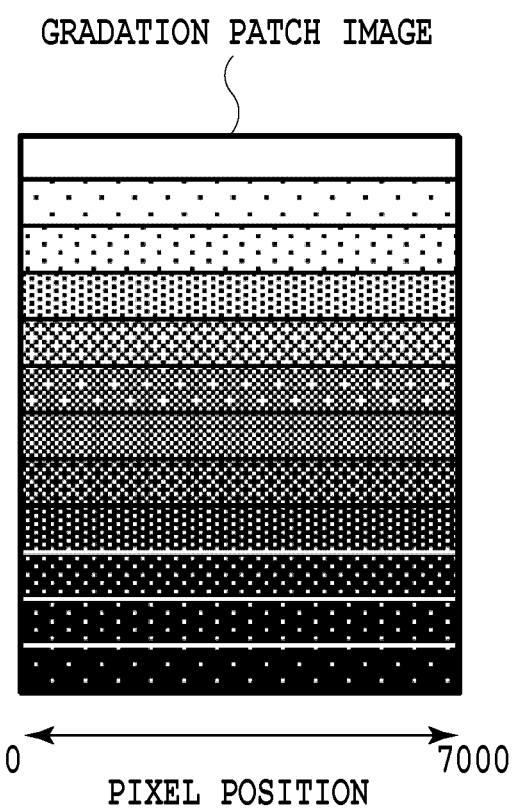
FIG. 17 is an image diagram showing gradation patch image data in the first embodiment.

First, at step S1601, the by-position gradation characteristics detection unit 116 generates image data of a gradation patch image for relative gradation measurement. As FIG. 17 indicates, the image data of the gradation patch image that is generated here is configured so as to include a plurality of density patches the density of which is the same in the main scanning direction and the density of which differs stepwise in the sub scanning direction for each predetermined plurality of gradations of the input gradation value.

Next, at step S1602, the image forming unit 121 forms a gradation patch image on a printing medium based on the image data of the gradation patch image generated by the by-position gradation characteristics detection unit 116. This image data is the data for which the processing by the gamma correction processing unit and the halftone processing unit has been performed as described previously.

Next, at step S1603, the image reading unit 123 acquires read image data by measuring the gradation patch image formed on the printing medium by an image sensor and outputs the acquisition results to the by-position gradation characteristics detection unit 116. This operation is performed by, for example, a user setting the printing medium on which the gradation patch image is printed and giving instructions to read the image by performing a predetermined operation from an operation unit, not shown schematically.

Next, at step S1604, the by-position gradation characteristics detection unit 116 calculates the input/output characteristics for each pixel position in the main scanning direction from the read data of the gradation patch image acquired by the image reading unit 123. Details will be described later.

Next, at step S1605, the by-position gradation characteristics detection unit 116 generates reference gamma correction characteristics (indicated by the solid line in FIG. 4B) based on the input/output characteristics (indicated by the solid line in FIG. 4A) at the reference pixel position L. The reference gamma correction characteristics within the reference gamma correction characteristics storage unit 114 are updated by the generated reference gamma correction characteristics. As described above, in the present embodiment, in the relative gamma characteristics detection mode also, the reference gamma correction characteristics are updated.

Next, at step S1606, the by-position gradation characteristics detection unit 116 calculates a relative relationship between the input/output characteristics (indicated by the dot line in FIG. 6A) at the reference pixel position L and the input/output characteristics for each pixel position in the main scanning direction for each pixel position.

Figure 18B:
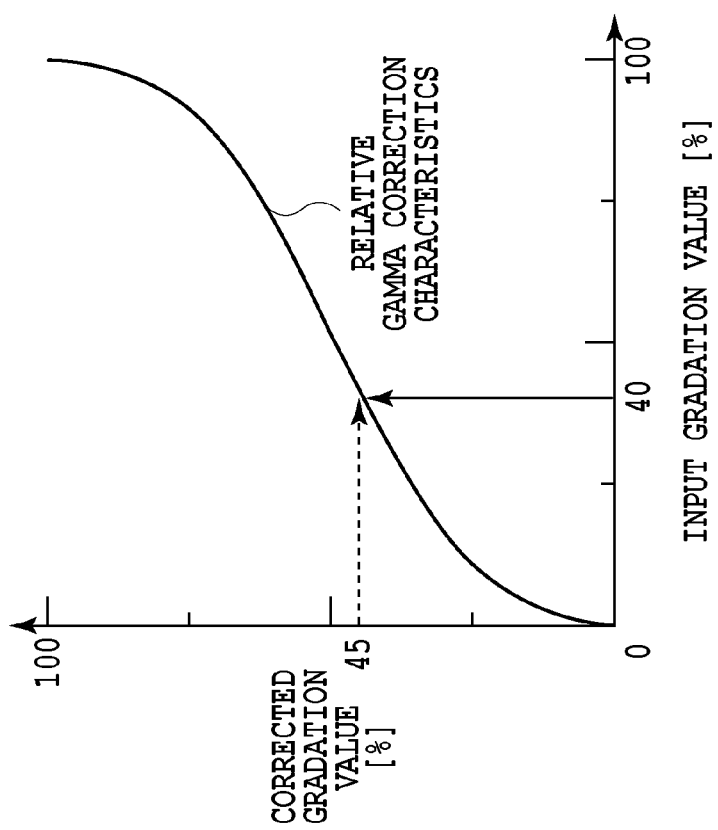
FIG. 18B is a diagram for explaining the method of calculating the relative gamma correction characteristics in the first embodiment.
Figure 18A:
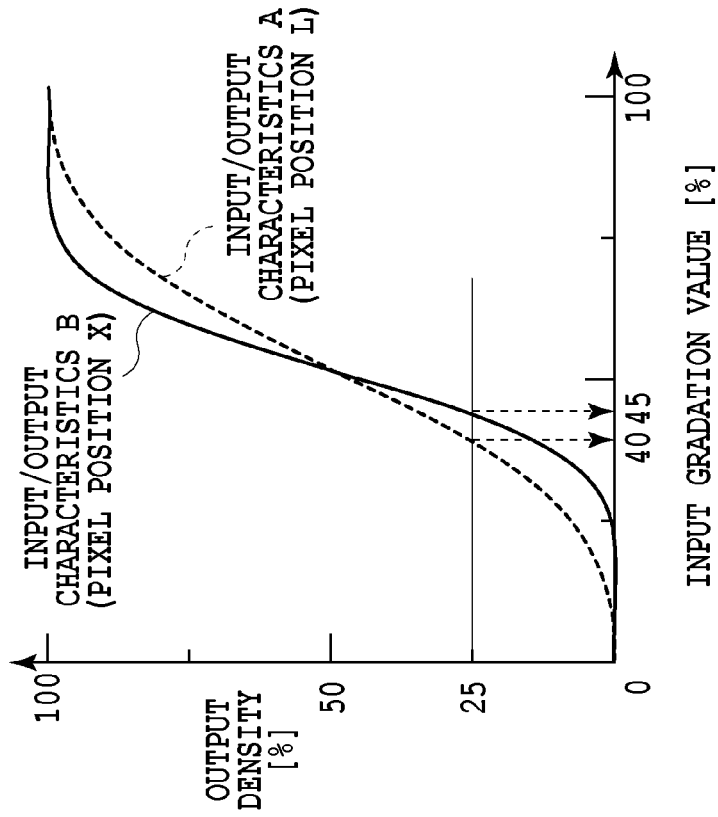
FIG. 18A is a diagram for explaining a method of calculating the relative gamma correction characteristics in the first embodiment.

FIG. 18A and FIG. 18B are diagrams for explaining an example of a method of calculating relative gamma correction characteristics. In input/output characteristics A at the pixel position L shown in FIG. 18A, the input gradation value at which the output density is 25% is 40. On the other hand, in input/output characteristics B at the pixel position X, the input gradation value at which the output density is 25% is 45. In order to obtain the density at the pixel position X that is the same as that at the pixel position L, it is sufficient to generate characteristics of relative gradation correction so as to correct the difference in the gradation. That is, as shown in FIG. 18B, relative gamma correction characteristics are generated so that the corrected gradation value is 45 for the input gradation value 40. As described previously, in the normal mode, as the input gradation value of the relative gamma correction characteristics thus generated, the first corrected gradation value gamma-corrected based on the reference gamma correction characteristics is input and the second corrected gradation value is output as an output.

Next, at step S1607, the by-position gradation characteristics detection unit 116 generates relative gamma correction characteristics (e.g., indicated by the solid line in FIG. 6B) based on the relative relationship calculated at step S1606. The by-position gradation characteristics detection unit 116 updates the relative gamma correction characteristics stored in the relative gamma correction characteristics storage unit 115 by the generated relative gamma correction characteristics and the relative gamma characteristics detection mode is terminated.

(Other Embodiments)

In the first embodiment, the example is explained in which the relative gamma characteristics detection mode is provided and the relative gamma correction characteristics are updated based on the gradation characteristics data for each pixel position acquired by the image reading unit 123. However, in the case where the fluctuations in the relative gamma correction characteristics with the passage of time are small (or the fluctuations are permitted), a configuration may be accepted in which the relative gamma characteristics detection mode is not provided. In this case, it is only necessary to acquire the relative gamma correction characteristics once at the time of shipment and it is made possible to apply the present invention even to an image forming apparatus on which the image reading unit 123 is not mounted.

In the first embodiment, the gamma correction processing unit 111 determines the pixel position in the main scanning direction for each pixel of the image data. This is performed in order to specify the relative gamma correction characteristics corresponding to a certain pixel that is the target of correction processing. However, it is also possible for the gamma correction processing unit 111 to implement the same embodiment without determining the main scanning direction for each pixel of the image data. For example, a counter is held that is incremented by one each time the density correction processing for each pixel is completed. At the time of start of the processing of a certain line, the counter is set to the initial value 0 and the density correction processing is started. The gamma correction processing unit 111 switches the characteristics to the second correction characteristics in the case where the counter indicates a predetermined count value or may select the corresponding second correction characteristics for each counter value.

In the first embodiment, the configuration is explained in which the reference gamma correction characteristics storage unit and the relative gamma correction characteristics storage unit are included in the image processing controller. However, an aspect may be accepted in which each of the gamma correction characteristics stored by these units is stored in an external server and the image processing controller acquires the gamma correction characteristics from the external server and performs processing.

In the first embodiment, the example is explained in which the gamma correction processing unit first derives the first corrected gradation value based on the reference gamma correction characteristics and then the second corrected gradation value is derived by using the relative gamma correction characteristics with the first corrected gradation value as an input. However, the order may be reversed. That is, processing may be accepted in which a third corrected gradation value is derived by using the relative gamma correction characteristics with the gradation value of the image data as an input and a fourth corrected gradation value is derived by using the reference gamma correction characteristics with the third corrected gradation value as an input.

(Other Embodiments)

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM, a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, the effect that the unevenness in density within the printing surface can be improved efficiently is obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-205738, filed Oct. 19, 2015, which is hereby incorporated by reference wherein in its entirety.

What is claimed is:

1. An electrophotographic image forming apparatus that forms an image by scanning a photoconductor drum in a main scanning direction with light beams based on image data, the image forming apparatus comprising:
one or more processors; and
at least one memory storing instructions which, when executed by the one or more processors, cause the image forming apparatus to:
acquire first correction characteristics representing an output density for an input gradation value at a reference position in a main scanning direction;
acquire second correction characteristics representing a relative relationship of an output density at a predetermined position in the main scanning direction with the output density at the reference position in the main scanning direction; and
correct the image data corresponding to the predetermined position in the main scanning direction based on the acquired first correction characteristics and the acquired second correction characteristics.

2. The image forming apparatus according to claim 1, wherein in acquiring the second correction characteristics, the instructions, when executed by the one or more processors, cause the image forming apparatus to:
determine a position of a pixel of the image data and acquire second correction characteristics corresponding to the position of the pixel.

3. The image forming apparatus according to claim 1, further comprising:
a storage configured to store second correction characteristics representing a relative relationship of the output density at the predetermined position in the main scanning direction with the output density at the reference position in the main scanning direction,
wherein in acquiring the second correction characteristics, the instructions, when executed by the one or more processors, cause the image forming apparatus to:
acquire second correction characteristics corresponding to a position of image data that is a target of processing among a plurality of second correction characteristics stored by the storage.

4. The image forming apparatus according to claim 1, wherein in acquiring the second correction characteristics, the instructions, when executed by the one or more processors, cause the image forming apparatus to:
read a second patch image including patches the gradation value of which is uniform in a main scanning direction and patches the gradation value of which is made to differ from another in a sub scanning direction, and
derive the second correction characteristics by using the density at the reference position of the second patch image and the density at the predetermined position.

5. The image forming apparatus according to claim 1, wherein the instructions, when executed by the one or more processors, further cause the image forming apparatus to:
measure a density of a first patch image formed at the reference position; and
derive the first correction characteristics by using the measured density and a target density.

6. The image forming apparatus according to claim 1, wherein in correcting the image data, the instructions, when executed by the one or more processors, cause the image forming apparatus to:
calculate second correction characteristics of a pixel located between predetermined positions set in advance by performing interpolation based on second correction characteristics at the predetermined positions neighboring the pixel.

7. The image forming apparatus according to claim 1, wherein in correcting the image data, the instructions, when executed by the one or more processors, cause the image forming apparatus to:
correct the image data by using the first correction characteristics and correct data after correction by using the second correction characteristics.

8. The image forming apparatus according to claim 1, wherein in correcting the image data, the instructions, when executed by the one or more processors, cause the image forming apparatus to:
correct the image data by using the second correction characteristics and correct data after correction by using the first correction characteristics.

9. The image forming apparatus according to claim 5, wherein in measuring the density, the instructions, when executed by the one or more processors, cause the image forming apparatus to:
measure a density of the first patch image formed on an intermediate transfer material.

10. The image forming apparatus according to claim 5, further comprising:
a first storage configured to store the first correction characteristics,
wherein in deriving the first correction characteristics, the instructions, when executed by the one or more processors, further cause the image forming apparatus to update first correction characteristics stored in the first storage by using derived first correction characteristics.

11. The image forming apparatus according to claim 4, wherein in reading the second patch image, the instructions, when executed by the one or more processors, cause the image forming apparatus to read the second patch image printed on a printing medium.

12. The image forming apparatus according to claim 4, further comprising:
a second storage configured to store the second correction characteristics,
wherein in deriving the second correction characteristics, the instructions, when executed by the one or more processors, cause the image forming apparatus to update second correction characteristics stored in the second storage by using derived second correction characteristics.

13. The image forming apparatus according to claim 1, wherein in correcting the image data, the instructions, when executed by the one or more processors, cause the image forming apparatus to selectively apply the first correction characteristics among a plurality of first correction characteristics corresponding to a plurality of screen types.

14. A density correction method in an electrophotographic image forming apparatus that forms an image by scanning a photoconductor drum in a main scanning direction with light beams based on image data, the density correction method comprising:
acquiring first correction characteristics representing an output density for an input gradation value at a reference position in a main scanning direction;
acquiring second correction characteristics representing a relative relationship of an output density at a predetermined position in the main scanning direction with the output density at the reference position in the main scanning direction; and correcting the image data based on the acquired first correction characteristics and the acquired second correction characteristics.

15. A non-transitory computer readable storage medium storing a program for causing a computer to function as an electrophotographic image forming apparatus that forms an image by scanning a photoconductor drum in a main scanning direction with light beams based on image data, the program when executed causing the image forming apparatus to:

acquire first correction characteristics representing an output density for an input gradation value at a reference position in a main scanning direction;

acquire second correction characteristics representing a relative relationship of an output density at a predetermined position in the main scanning direction with the output density at the reference position in the main scanning direction; and correct the image data corresponding to the predetermined position in the main scanning direction based on the acquired first correction characteristics and the acquired second correction characteristics.

\* \* \* \* \*